United States Patent
Sakai et al.

(10) Patent No.: US 6,785,117 B2
(45) Date of Patent: Aug. 31, 2004

(54) CAPACITIVE DEVICE

(75) Inventors: Minekazu Sakai, Kariya (JP);
Toshiyuki Tsuchiya, Aichi-gun (JP);
Hirofumi Funabashi, Nagoya (JP);
Norio Fujitsuka, Nisshin (JP);
Yasuichi Mitsushima, Hashima (JP)

(73) Assignee: Denso Corporation, Kaiya (JP)

( * ) Notice: Subject to any disclaimer, the term of this patent is extended or adjusted under 35 U.S.C. 154(b) by 0 days.

(21) Appl. No.: 10/386,100

(22) Filed: Mar. 12, 2003

(65) Prior Publication Data

US 2003/0210511 A1 Nov. 13, 2003

(30) Foreign Application Priority Data

Mar. 15, 2002 (JP) ........................... 2002-071572

(51) Int. Cl.$^7$ ............................ H01G 7/00; H01G 5/00
(52) U.S. Cl. ........................... 361/280; 361/287
(58) Field of Search ..................... 361/277–280, 361/287, 292

(56) References Cited

U.S. PATENT DOCUMENTS

| | | | |
|---|---|---|---|
| 5,491,604 A | * | 2/1996 | Nguyen et al. ............. 361/278 |
| 5,955,932 A | * | 9/1999 | Nguyen et al. ............. 333/186 |
| 6,151,968 A | | 11/2000 | Chou |
| 6,236,281 B1 | * | 5/2001 | Nguyen et al. ............. 331/154 |
| 2002/0159218 A1 | * | 10/2002 | Harris et al. ............. 361/277 |

FOREIGN PATENT DOCUMENTS

JP   A-2000-49358   2/2000

OTHER PUBLICATIONS

Daniel and Moore, "A microaccelerometer structure fabricated in silicon–on–insulator Using a focused ion beam process", *Sensors and Actuators 73*, 1999, pp. 201–209.

* cited by examiner

Primary Examiner—Dean A. Reichard
Assistant Examiner—Eric Thomas
(74) Attorney, Agent, or Firm—Posz & Bethards, PLC

(57) ABSTRACT

A capacitive device includes a substrate, a movable electrode, and a fixed electrode. The movable electrode is located above a surface of the substrate and is movable with respect to the substrate along directions that are substantially orthogonal to the surface. The fixed electrode is stationary with respect to the substrate. When the movable electrode is displaced in a first direction that is substantially orthogonal to the surface, the total sum of area-distance quotients in the overlap between the electrodes remains substantially unchanged or decreases to provide a first reduction rate that is substantially zero or more. On the other hand, when the movable electrode is displaced in a second direction that is substantially opposite to the first direction, the total sum of area-distance quotients remains substantially unchanged or decreases to provide a second reduction rate that is substantially zero or more. The reduction rates are different from each other.

14 Claims, 11 Drawing Sheets

CAPACITIVE DEVICE

CROSS REFERENCE TO RELATED APPLICATION

This application is based on and incorporates herein by reference Japanese Patent Application No. 2002-71572 filed on Mar. 15, 2002.

BACKGROUND OF THE INVENTION

The present invention relates to a capacitive device that includes a fixed electrode and a movable electrode, which moves in response to an inertial force and an electrostatic force that act on the movable electrode.

Research and development work is underway on a sensor that is capable of measuring a physical quantity such as acceleration and angular velocity that is related to an inertial force along directions substantially orthogonal to a surface of the substrate of the sensor. The sensor includes a movable electrode and a fixed electrode. The movable electrode floats above the substrate surface and can move with respect to the substrate along directions substantially orthogonal to the substrate surface. The fixed electrode is fixed to the substrate and stationary with respect to the substrate.

Such a sensor is under development in order to meet a need to measure not only a physical quantity substantially parallel to the substrate surface but also a physical quantity substantially orthogonal to the substrate surface, as well as a need to place the substrate surface substantially orthogonally to the directions along which the inertial force related to the physical quantity is applied for the sake of stability. With respect to such a sensor, there is a desire not only to measure the magnitude of the physical quantity but also to detect in which one of the directions that are substantially orthogonal to the substrate surface the inertial force acts.

A first proposed sensor for the desire includes a substrate, a plate-like weight that is parallel to a surface of the substrate and movable orthogonally to the surface of the substrate, a movable electrode that is located on a surface of the weight, and a fixed electrode placed above the weight to face the movable electrode. When the movable electrode is displaced with the weight toward the fixed electrode, or in a first direction that is substantially orthogonal to the substrate surface, a distance between the movable electrode and the fixed electrode decreases, and consequently, the capacitance formed therebetween increases.

When the weight is displaced in the direction away from the fixed electrode, or in a second direction that are substantially opposite to the first direction, the distance between the movable electrode and the fixed electrode increases, and, as a result, the capacitance formed therebetween decreases. Therefore, it is possible to detect in which one of the first and second directions the inertial force acts on the basis of whether the capacitance is increasing or decreasing, even if the variance of the capacitance is the same.

In the first proposed sensor, however, the movable electrode and the fixed electrode are stacked to face each other along the directions orthogonal to the substrate surface. In order to realize such a structure, a layer corresponding to the movable electrode, a layer corresponding to the fixed electrode, and a sacrificial layer need to be stacked first such that the sacrificial layer becomes located between the other two layers, and then the sacrificial layer needs to be stripped off by a complex etching process.

Alternatively, a publication JP-A-2000-49358 discloses a sensor (second proposed sensor) that is capable of detecting the direction along which the inertial force acts, even though the fixed electrode and the movable electrode of the sensor are formed from a single layer.

As shown in FIG. 1, the second proposed sensor 1 includes a movable electrode 5, which floats above a surface of a substrate 2 and is movable along the directions that are substantially orthogonal to the substrate, or along the z-axis of FIG. 1, and a fixed electrode 6, which is fixed onto the substrate 2. The second proposed sensor 1 measures a physical quantity that is related to an inertial force applied on the sensor 1 on the basis of the variance in the capacitance between the movable electrode 5 and the fixed electrode 6 when the movable electrode 5 moves in response to the inertial force along the directions that are substantially orthogonal to the substrate surface.

For example, when the movable electrode 5 moves in the positive direction along the z-axis as shown in FIG. 2, which is a first direction that is substantially orthogonal to the substrate surface, the capacitance increases because the overlap between the movable electrode 5 and the fixed electrode 6 increases to S10 in comparison with the overlap in FIG. 1. On the other hand, when the movable electrode 5 moves in a negative direction along the z-axis as shown in FIG. 3, which is a second direction that is substantially orthogonal to the substrate surface, the overlap becomes smaller to S20 in comparison with the overlap in FIG. 1, and, consequently, the capacitance decreases. As a result, it is possible to detect in which one of the first and second directions the inertial force acts on the basis of whether the capacitance is increasing or decreasing, even if the variance of the capacitance is the same. The second proposed sensor 1 of FIG. 1, however, includes a space 8, where a sacrificial layer having steps was located in the manufacturing process of the second proposed sensor 1. Therefore, a complicated manufacturing process is required in order to form the sacrificial layer.

Alternatively, a sensor (third proposed sensor) is proposed in J. H. Daniel, D. F. Moore, Sensors and Actuators A73 (1999), pages 201–209. In the third proposed sensor, the electrode-confronting surfaces of the fixed and movable electrodes of the sensor, at which the fixed and movable electrodes face each other, are tilted at an angle with respect to the directions that are substantially orthogonal to a substrate surface of the third proposed sensor, so that the capacitance between the electrodes increases when the movable electrode moves in a first direction that is substantially orthogonal to the substrate surface, while the capacitance decreases when the movable electrode moves in a second direction that is substantially opposite to the first direction. In the third proposed sensor, however, an advanced manufacturing process is required for creating the structure in which the electrode-confronting surfaces of the fixed and movable electrodes are tilted at an angle with respect to the directions that are substantially orthogonal to the substrate surface.

In the second proposed sensor 1, if the surfaces of the electrodes at which the electrodes face the substrate surface might be substantially planar and parallel to the substrate surface and if the surfaces of the electrodes might be in approximately the same distance from the substrate surface before the movable electrode is dislocated, then the sacrificial layer to form the part 8 would not need the steps and it would be possible to manufacture the sensor 1 using a relatively simple manufacturing process. In the third proposed sensor as well, if the electrode-confronting surfaces of the electrodes would not need to be tilted at an angle with respect to the directions that are substantially orthogonal to the substrate surface and the electrode-confronting surfaces might be orthogonal to the substrate surface, it would be possible to manufacture the third proposed sensor using a relatively simple manufacturing process.

When the above structures were to be adopted in the proposed sensors, however, it would be difficult to increase the area-distance quotient, which is obtained by dividing the overlapping area between the electrodes by the distance between the electrodes. The capacitance between the electrodes substantially varies in proportion to the area-distance quotient, and it would basically only be possible to decrease or keep the area-distance quotient, no matter in which direction the movable electrode moves along the directions that are substantially orthogonal to the substrate surface if the above structures were to be adopted. Therefore, it would be difficult to make the capacitance greater than that when the movable electrode at the initial position if the above structures were to be adopted.

For this reason, it had been considered difficult to realize a physical quantity sensor that is capable of detecting the direction along which the inertial force acts on the sensor using the above structures, which can simplify the manufacturing process of the sensor.

SUMMARY OF THE INVENTION

The present invention has been made in view of the above aspects. A first object of the present invention is to simplify the structure of a capacitive physical quantity sensor that is capable of detecting the direction along which an inertial force acts on the sensor in order to simplify the manufacturing process of the sensor. A second object of the present invention is to provide other types of capacitive devices that include the same electrode structure that is used in the capacitive physical quantity sensor.

To achieve the above objects, a capacitive device according to the present invention includes a substrate, a movable electrode, and a fixed electrode. The movable electrode is located above a surface of the substrate and is movable with respect to the substrate along directions that are substantially orthogonal to the surface. The movable electrode includes a substrate-confronting surface, at which the movable electrode confronts the surface of the substrate, and an electrode-confronting surface.

The fixed electrode is stationary with respect to the substrate. The fixed electrode includes a substrate-confronting surface, at which the fixed electrode confronts the surface of the substrate, and an electrode-confronting surface. The substrate-confronting surfaces are substantially parallel to the surface of the substrate. The substrate-confronting surfaces are substantially planar and substantially at the same level along the directions that are substantially orthogonal to the surface of the substrate before the movable electrode is displaced.

The electrode-confronting surfaces confront each other and are substantially orthogonal to the surface of the substrate. When the movable electrode is displaced in a first direction that is substantially orthogonal to the surface of the substrate, the total sum of area-distance quotients in the overlap between the electrode-confronting surfaces remains substantially unchanged or decreases to provide a first reduction rate that is substantially zero or more. On the other hand, when the movable electrode is displaced in a second direction that is substantially opposite to the first direction, the total sum of area-distance quotients remains substantially unchanged or decreases to provide a second reduction rate that is substantially zero or more. The reduction rates are different from each other.

In the capacitive device according to the present invention, fringe capacitances are created between the edges of the electrode-confronting surfaces of the movable electrode and the fixed electrode. Due to the fringe capacitances, the net capacitance between the electrodes increases when the movable electrode is displaced in one of the first and second directions, the reduction rate in which is smaller than the other. On the other hand, even though the fringe capacitances are added, the net capacitance decreases when the movable electrode is displaced in the other of the directions. As a result, it is possible to detect in which direction along the directions that are substantially orthogonal to the surface of the substrate the movable electrode is displaced on the basis of the increase or the decrease in the net capacitance.

In the capacitive device according to the present invention, the substrate-confronting surfaces are substantially parallel to the surface of the substrate. In addition, the substrate-confronting surfaces are substantially planar and substantially at the same level along the directions that are substantially orthogonal to the surface of the substrate before the movable electrode is displaced. As a result, the sacrificial layer used for manufacturing the capacitive device according to the present invention does not need such a complex manufacturing process that is used for forming the sacrificial layer having the steps of the second proposed sensor.

Furthermore, in the capacitive device according to the present invention, the electrode-confronting surfaces confront each other and are substantially orthogonal to the surface of the substrate. Therefore, the advanced manufacturing process for forming the tilted electrode-confronting surfaces of the third proposed sensor is not necessary. Thus, the manufacturing process of the capacitive device according to the present invention is relatively short and simple.

With the electrode structure of the capacitive device according to the present invention, when a potential difference is applied between the movable electrode and the fixed electrode, the electrodes are electrostatically attracted to each other. In addition, the electrostatic attraction that acts on the movable electrode forces the movable electrode to move in one of the first and second directions. In other word, it is possible to arbitrarily drive the movable electrode along the directions that are substantially orthogonal to the surface of the substrate using the potential difference. Thus, a variety of capacitive devices that make use of the drivability are achieved according to the present invention.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

The present invention will be described in detail with reference to various embodiments.

First Embodiment

Figure 4:
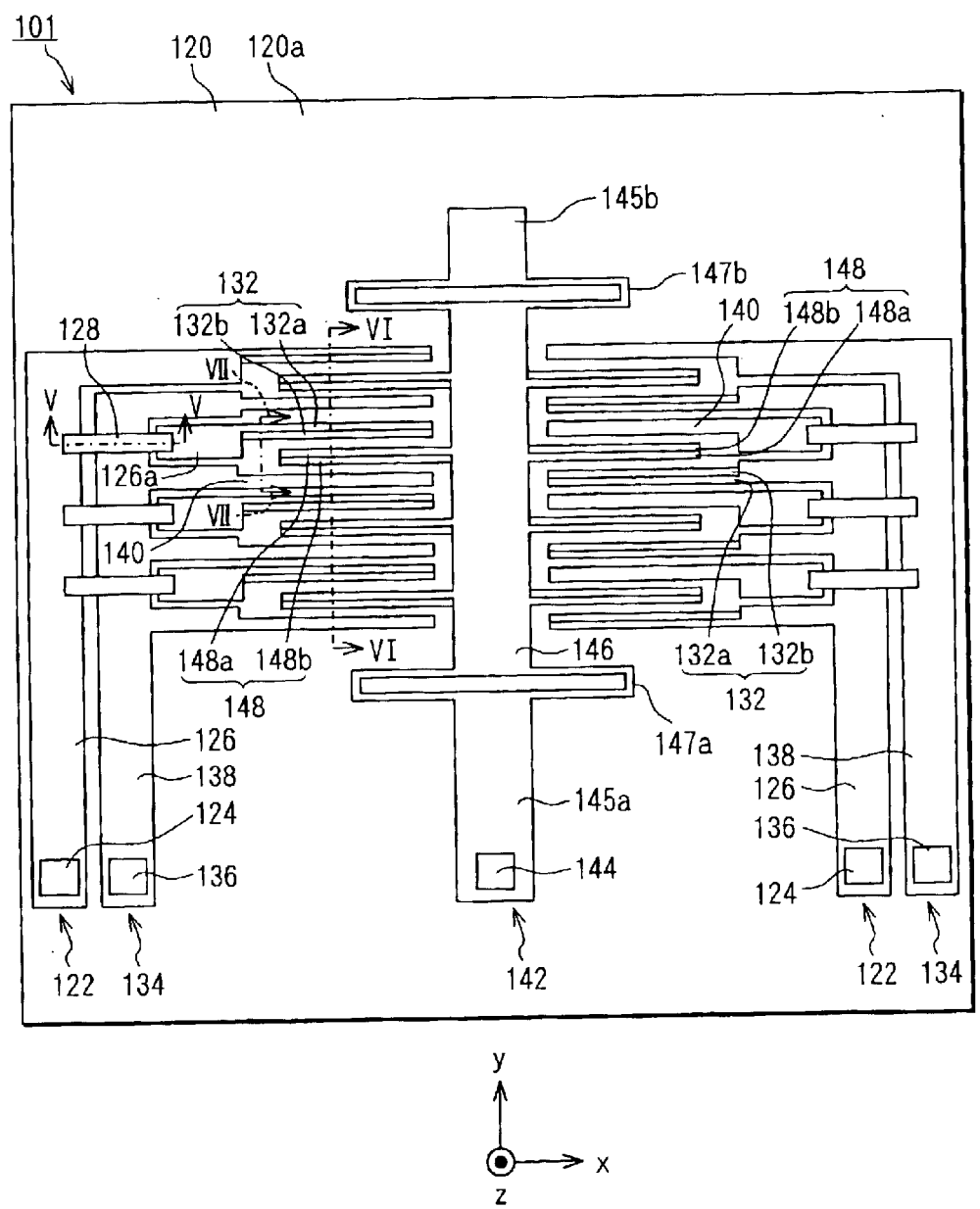
FIG. 4 is a schematic plan view of a semiconductor physical quantity sensor according to a first embodiment.
Figure 5:
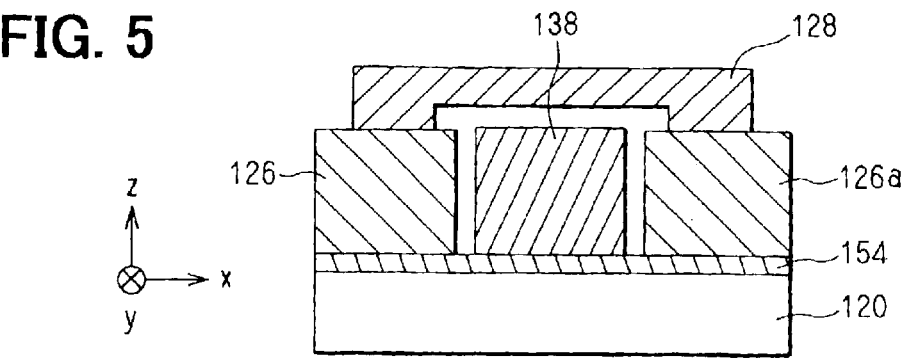
FIG. 5 is a schematic cross-sectional view of a portion of the sensor of FIG. 4 taken along a line V—V in FIG. 4.

As shown in FIGS. 4 and 5, a semiconductor physical quantity sensor 101 according to a first embodiment has a Silicon-On-Insulator (SOI) structure and is composed of an active layer, an insulating intermediate layer 154, and a supporting substrate 120. The active layer and the supporting substrate 120 are made of silicon, and the insulating intermediate layer 154 is made of silicon oxide.

The active layer includes a movable electrode unit 142, two first fixed electrode units 122, and two second fixed electrode units 134. The movable unit 142 is composed of a weight 146, two comb-shaped movable electrodes 148, two rectangular springs 147a, 147b, two anchors 145a, 145b, and an electrode terminal 144. The weight 146, the springs 147a, 147b, and the movable electrodes 148 are supported by the anchors 145a, 145b and float above a surface 120a of the substrate 120. The anchors 145a, 145b and the weight 146 are rectangular and the longitudinal directions thereof are substantially parallel to the y-axis. The anchors 145a, 145b and the weight 146 are thin plate having a predetermined thickness along the z-axis of FIG. 4.

Figure 1:
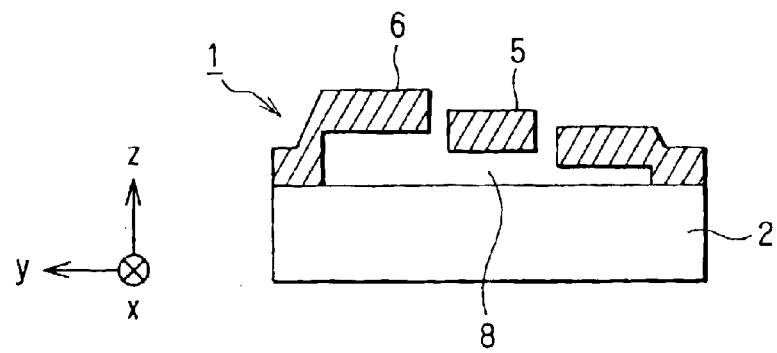
FIG. 1 is a schematic cross-sectional view of a proposed sensor.
Figure 2:
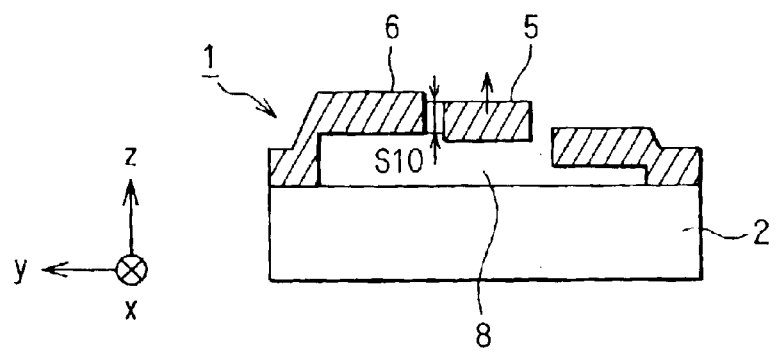
FIG. 2 is a schematic cross-sectional view of the sensor of FIG. 1 showing a state that a movable electrode of FIG. 1 has moved in the positive direction along the z-axis of FIG. 1.
Figure 3:
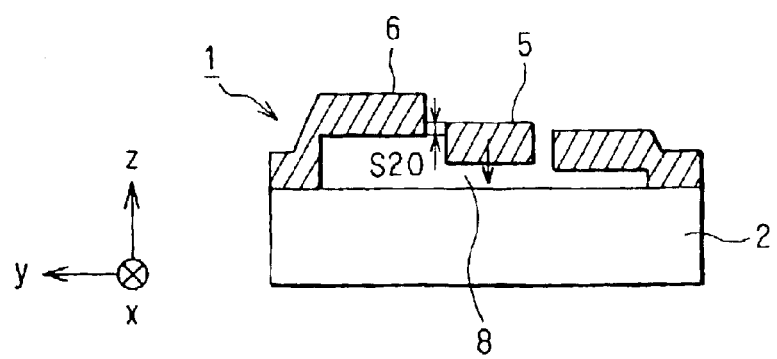
FIG. 3 is a schematic cross-sectional view of the sensor of FIG. 1 showing a state that the movable electrode of FIG. 1 has moved in the negative direction along the z-axis of FIG. 1.

As shown in FIG. 4, the springs 147a, 147b are rectangular frames that can stretch. Each of the rectangular springs 147a, 147b includes two beams, which are substantially parallel to each other and connected to each other at its both ends. Each of the rectangular spring 147a, 147b functions as a spring to be deformed along the z-axis of FIG. 1. Therefore, the movable electrodes 148 moves with the weight 146 along the z-axis of FIG. 1 when the movable unit 142 is accelerated along the z-axis and moves back to the original position when the acceleration becomes zero. The length, or the thickness, of the springs 147a, 147b along the z-axis should preferably be smaller than the length, or the width, along the y-axis in order to permit the weight 146 move readily along the z-axis. The electrode terminal 144, which is formed by, for example, aluminum vapor phase deposition, is located on one of the anchors 145a.

The movable electrodes 148 are joined to the weight 146. In addition, the springs 147a, 147b are joined to the weight 146 and the anchors 145a, 145b. Each of the movable electrodes 148 further includes four movable electrode beams 148. Each of the movable electrode beams 148 further includes a first movable electrode portion 148a and a second movable electrode portion 148b. The anchors 145a, 145b are fixed onto the substrate 120 through the insulating layer 154, which is not shown in FIG. 4. The movable electrodes 148 can move with the weight 146 along the directions that are substantially orthogonal to the surface 120a of the substrate 120, or along the z-axis of FIG. 4. The z-axis is orthogonal to the x-axis, which is parallel to the horizontal directions of FIG. 4, and orthogonal to the y-axis, which is parallel to the vertical directions of FIG. 4.

In the figures that are referred hereinafter, the z-axis is the one that runs along the directions that are orthogonal to the surface 120a of the substrate 120, above which the movable electrodes 148 are displaced. The x-axis is the one that runs along the directions that are substantially parallel to the movable electrode beams 148. The y-axis is the one that runs along the directions that are substantially parallel to the surface 120a of the substrate 120 and substantially orthogonal to the movable electrode beams 148. The x, y, and z-axes are orthogonal to one another. With respect to the x and y-axes, the directions of arrows in FIG. 1 shall be the positive directions, and the opposite directions shall be the negative directions. With respect to the z-axis, the positive direction is the one that runs from the rear side to the front side of FIG. 4, and the opposite direction shall be the negative direction.

The movable electrodes 148 are respectively located on left and right ends of the weight 146 in FIG. 4. The movable electrodes 148 are mechanically and electrically linked to the weight 146. As shown in FIG. 4, the movable electrode beams 148 are substantially straight. The four beams 148 of each of the movable electrodes 148 extend out in equal intervals in the positive and negative directions of the x-axis from two ends of the weight 146, which stretches along the y-axis. In the above arrangement, the movable electrodes 148 are substantially symmetrical with respect to the weight 146, so it is possible to displace the weight 146 and the movable electrodes 148 in a stable manner.

As shown in FIG. 4, two pairs of the first and second fixed electrode units 122, 134 are placed on the left hand side and on the right hand side of the sensor 101 in FIG. 4, respectively. The left first fixed electrode unit 122 is located closer to the left end of the sensor 101 than the left second fixed electrode unit 134. The right second fixed electrode unit 134 is located closer to the right end of the sensor 101 than the right first fixed electrode unit 122. Each of the first fixed electrode units 122 includes a first fixed portion 126, an electrode terminal 124, and a first comb-shaped fixed electrode 132. Each of the first fixed electrodes 132 further includes four first fixed electrode beams 132. Each of the first fixed electrode beams 132 further includes a first fixed electrode portion 132a and a second fixed electrode portion 132b. Each of the second fixed electrode units 134 includes a second fixed portion 138, an electrode terminal 136, and a second comb-shaped fixed electrode 140. Each of the second fixed electrodes 140 further includes four second fixed electrode beams 140.

Each of the first and second fixed electrode units 122, 134, respectively, is fixed at a portion thereof onto the substrate 120 through the insulating layer 154, which is not shown in FIG. 4. The four left fixed electrode beams 132, 140 of each of the left fixed electrodes 132, 140 extend out in the positive direction of the x-axis from the left fixed portions 126, 138, which stretch along the y-axis. The four left fixed electrode beams 132, 140 of each of the left fixed electrodes 132, 140 are located at constant intervals along the y-axis. As shown in FIG. 4, however, the lower three beams 132 out of the four left first fixed electrode beams 132 do not extend continuously out of the left first fixed portion 126, which extends along the y-axis, because the lower three beams 132 are blocked by the left second fixed portion 138, which is a part of the left second fixed electrode unit 134.

Figure 6:
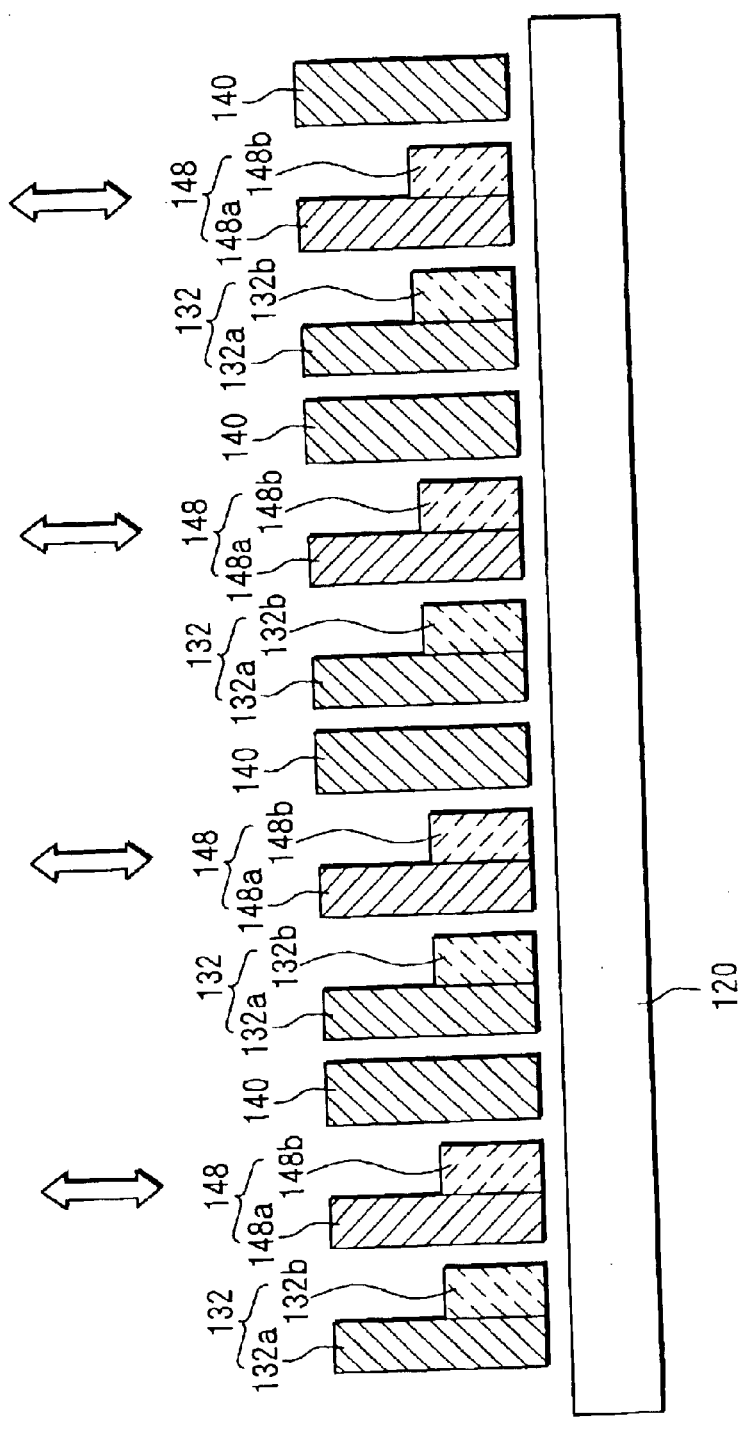
FIG. 6 is a schematic cross-sectional view of a portion of the sensor of FIG. 4 taken along a line VI—VI in FIG. 4.

Instead, the lower three beams 132 are first linked to connecting fixed portions 126a. The connecting fixed portions 126a are connected to the left first fixed portion 126 by connecting bridges 128. As shown in FIG. 5, the connecting bridges 128 span over the left second fixed portion 138 of the left second fixed electrode unit 134. The connecting bridges 128 are made of polycrystalline silicon in order to achieve a low resistivity. Each of the left fixed electrodes 132, 140 are interleaved with the left movable electrode 148, as illustrated in FIG. 4. The left first fixed electrode beams 132, the left movable electrode beams 148, and the left second fixed electrode beams 140 repeat themselves in the order listed from top to bottom in FIG. 4 and from left to right in FIG. 6.

The right first and second fixed electrode units 122, 134 are arranged substantially symmetrically to the left second and first fixed electrode units 134, 122 with respect to the weight 46. In addition, the right first fixed electrode beams 132, the right movable electrode beams 148, and the right second fixed electrode beams 140 repeat themselves in the order listed from bottom to top in FIG. 4. The electrode terminal 144 of the movable electrode unit 142 and the electrode terminals 124, 136 of the fixed electrode units 122, 134 are aligned along the x-axis in an area of the sensor 101 on the lower side of FIG. 4. As a result, the terminals are connected readily to, for example, a circuit for measuring the capacitance between the electrodes 132, 140, 148, although the circuit is not illustrated in the figure.

Figure 7:
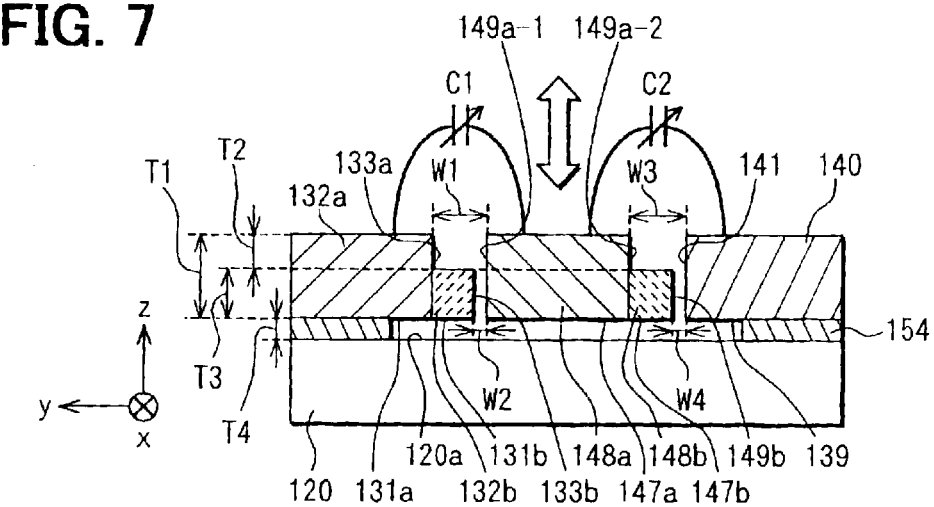
FIG. 7 is a schematic cross-sectional view of a portion of the sensor of FIG. 4 taken along a line VII—VII in FIG. 4 showing two fixed electrodes and a movable electrode, which is located between the two fixed electrodes.

As shown in FIG. 7, each of the first fixed electrode portions 132a includes a first fixed electrode portion substrate-confronting surface 131a. Each of the second fixed electrode portions 132b includes a second fixed electrode portion substrate-confronting surface 131b. Each of the first movable electrode portions 148a includes a first movable electrode portion substrate-confronting surface 147a. Each of the second movable electrode portions 148b includes a second movable electrode portion substrate-confronting surface 147b. Each of the second fixed electrode beams 140 includes a second fixed electrode beam substrate-confronting surface 139. The substrate-confronting surfaces 131a, 131b, 147a, 147b, 139 are substantially planar, parallel to the substrate surface 120a, and in approximately the same distance from the substrate surface 120a before the movable electrodes 148 have moved. Incidentally, although scales are different between the electrodes in FIG. 6 and those in FIG. 7, the basic structure of the electrodes is the same.

As shown in FIG. 7, each of the first fixed electrode portions 132a includes a first fixed electrode portion electrode-confronting surface 133a. Each of the second fixed electrode portions 132b includes a second fixed electrode portion electrode-confronting surface 133b. Each of the first movable electrode portions 148a includes a first movable electrode portion first electrode-confronting surface 149a-1 and a first movable electrode portion second electrode-confronting surface 149a-2. Each of the second movable electrode portions 148b includes a second movable electrode portion electrode-confronting surface 149b. Each of the second fixed electrode beams 140 includes a second fixed electrode beam electrode-confronting surface 141.

The electrode-confronting surfaces 133a, 133b of each of the first fixed electrode beams 132 confront the first movable electrode portion first electrode-confronting surface 149a-1. The electrode-confronting surfaces 133a, 133b, 149a-1 extend along the z-axis and are rectangular. Furthermore, side surfaces of the electrode-confronting surfaces 133a, 133b, 149a-1 also extend along the z-axis. As an example, one of the first movable electrode portion first electrode-confronting surfaces 149a-1 is shown with its side faces 170a, 170b in FIG. 10.

Figure 10:
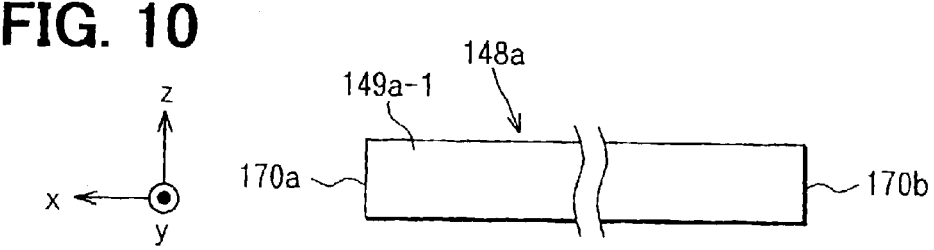
FIG. 10 is a partial plan view of one of the movable electrodes in FIG. 7 when viewed in the negative direction of the y-axis of FIG. 7.

There is a step between the first fixed electrode portion electrode-confronting surface 133a and the second fixed electrode portion electrode-confronting surface 133b. The first fixed electrode portion electrode-confronting surface 133a is located further away from the substrate surface 120a than the second fixed electrode portion electrode-confronting surface 133b. The first fixed electrode portion electrode-confronting surface 133a is separated from the first movable electrode portion first electrode-confronting surfaces 149a-1 by a first distance W1, which is 8.5 $\mu$m long. The second fixed electrode portion electrode-confronting surface 133b is separated from the first movable electrode portion first electrode-confronting surfaces 149a-1 by a second distance W2, which is 3 $\mu$m long. As shown in FIGS. 7 and 10, the first movable electrode portion first electrode-confronting surface 149a-1 is substantially planar.

The first movable electrode portion second electrode-confronting surface 149a-2 and the second movable electrode portion electrode-confronting surface 149b confront the second fixed electrode beam electrode-confronting surface 141. The electrode-confronting surfaces 149a-2, 149b, 141 extend along the z-axis and are rectangular. Furthermore, side surfaces of the electrode-confronting surfaces 149a-2, 149b, 141 also extend along the z-axis.

There is a step between the first movable electrode portion second electrode-confronting surface 149a-2 and the second movable electrode portion electrode-confronting surface 149b. The first movable electrode portion second electrode-confronting surface 149a-2 is located further away from the substrate surface 120a than the second movable electrode portion electrode-confronting surface 149b. The first movable electrode portion second electrode-confronting surface 149a-2 is separated from the second fixed electrode beam electrode-confronting surface 141 by a third distance W3, which is 8.5 $\mu$m long. The second movable electrode portion electrode-confronting surface 149b is separated from the second fixed electrode beam electrode-confronting surface 141 by a fourth distance W4, which is 3 $\mu$m long. As shown in FIG. 7, the second fixed electrode beam electrode-confronting surface 141 is substantially planar.

In the sensor 101 of FIG. 4, the second and fourth distances W2, W4 are equal to each other, and the first and third distances W1, W3 are equal to each other. In each of the movable electrode beams 148, one first movable electrode portion 148a and one second movable electrode portion 148b are integrated. If the two movable electrode portions 148a, 148b were to be displaced separately and independently, there would be a concern that the magnitudes of displacements of the two movable electrode portions 148a, 148b might be different when an inertial force that is related to a physical quantity to be measured acts on the sensor 101. In that case, the physical quantity might not be precisely detected on the basis of the magnitudes of the displacements of the two movable electrode portions 148a, 148b. The two movable electrode portions 148a, 148b are formed as a single unit in the sensor 101, so the two movable electrode portions 148a, 148b would not be displaced independently or separately. Therefore, the two movable electrode portions 148a, 148b have the same the magnitude of displacement. Thus, the physical quantity can be measured accurately in a stable manner on the basis of the magnitude of the displacement.

In the sensor 101, the length of the first movable electrode portion first electrode-confronting surface 149a-1 and the length of the second fixed electrode beam electrode-confronting surface 141 are equal to each other at a first length T1 (15 $\mu$m) along the z-axis. Furthermore, the length of the first fixed electrode portion electrode-confronting surface 133a (first planar surface) and the length of the first movable electrode portion second electrode-confronting surface 149a-2 (first planar surface) are equal to each other at a second length T2 (7.5 $\mu$m) along the z-axis. Furthermore, the second fixed electrode portion electrode-confronting surface 133b (second planar surface) and the length of the second movable electrode portion electrode-confronting surface 149b (second planar surface) are equal to each other at a third length T3 (7.5 $\mu$m) along the z-axis. That is, the second and third lengths T2, T3 are equal to each other. In addition, the second and third lengths T2, T3 are half in the first length T1. The thickness of the insulating layer 154, or a fourth length T4 of the insulating layer 154 along the z-axis, is 3 $\mu$m. When the SOI substrate is used, the fourth length T4 is preferably 0.5 to 3 $\mu$m, approximately.

Figure 11:
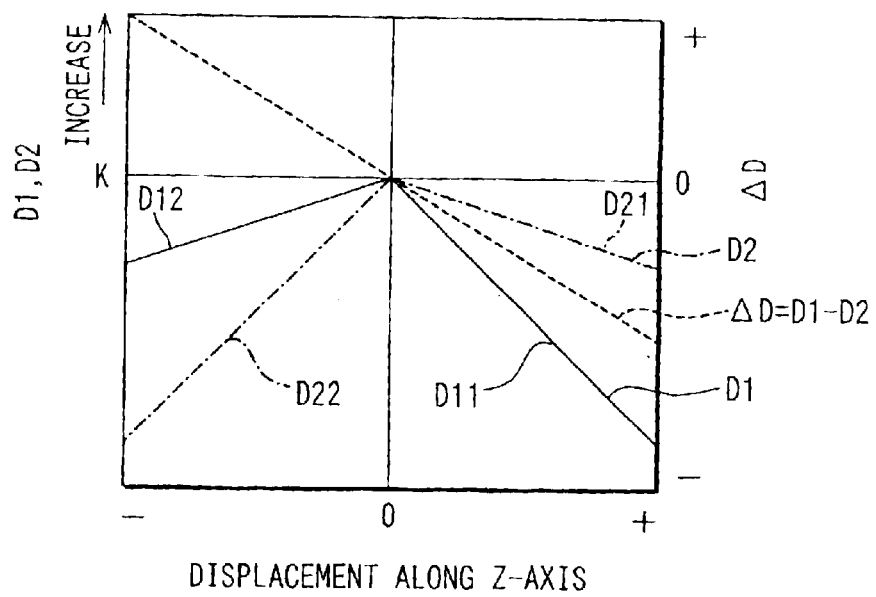
FIG. 11 is a graph showing the correlations between displacement along the z-axis and the total sums of the area-distance quotients in the overlap between one of the movable electrode beams and the corresponding second fixed electrode beams and the correlation between displacement along the z-axis and the difference between the total sums.

The operation of the semiconductor physical quantity sensor 101 of FIG. 4 will be described in detail next. FIG. 11 is a graph that qualitatively shows the correlation between the displacement along the z-axis and the first total sum D1, or the total sum of the area-distance quotients in the overlap between each of the first fixed electrode beams 132 and each of the corresponding movable electrode beams 148, the correlation between the displacement along the z-axis and the second total sum D2, or the total sum of the area-distance quotients in the overlap between each of the movable electrode beams 148 and each of the corresponding second fixed electrode beams 140, and the correlation between the displacement along the z-axis and the difference $\Delta$D between the total sums D1, D2.

An area-distance quotient is obtained by dividing an overlapping area between a movable electrode beam 148 and a corresponding fixed electrode beam 132, 140 by the distance between the beams 148, 132, 140 at the overlapping area. Therefore, for example, in the state of FIG. 7, the first total sum D1 is calculated by adding the quotient obtained by dividing the area of the first fixed electrode portion electrode-confronting surface 133a by the first distance W1 to the quotient obtained by dividing the area of the second fixed electrode portion electrode-confronting surface 133b by the second distance W2. Incidentally, the capacitance between a movable electrode beam 148 and a corresponding fixed electrode beam 132, 140 increases basically as the corresponding total sum of the area-distance quotients increases, as it is well known.

Figure 12:
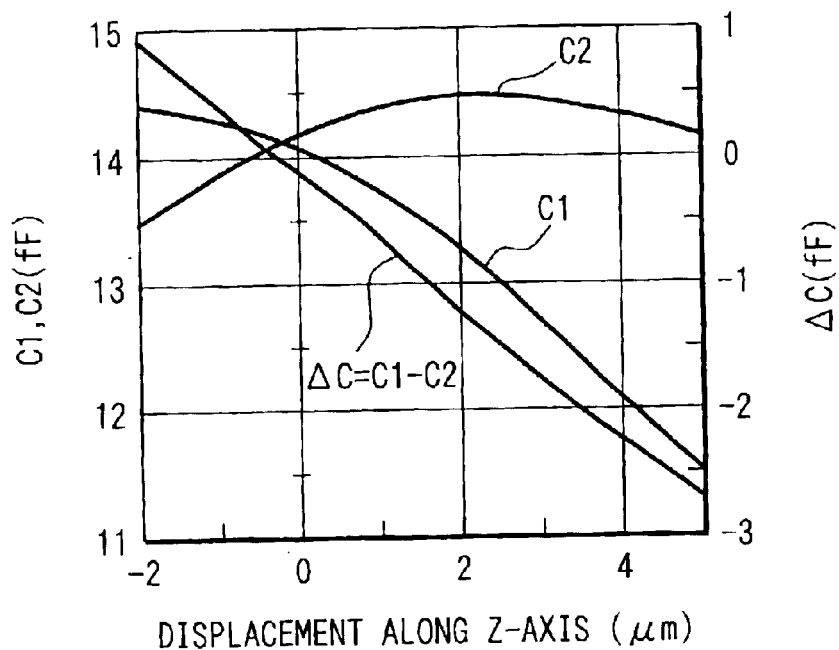
FIG. 12 is a graph showing the correlations between the displacements along the z-axis and the capacitances between one of the fixed electrode beams and the corresponding movable electrode beams and the correlation between the displacement along the z-axis and the difference between the capacitances.

FIG. 12 is the graph obtained by simulation showing the correlation between the displacement along the z-axis and the first capacitance C1, or the capacitance between each of the first fixed electrode beams 132 and each of the corresponding movable electrode beams 148, the correlation between the displacement along the z-axis and the second capacitance C2, or the capacitance between each of the movable electrode beams 148 and each of the corresponding second fixed electrode beams 140, and the correlation between the displacement along the z-axis and the difference $\Delta$C between the capacitances C1, C2.

Figure 8:
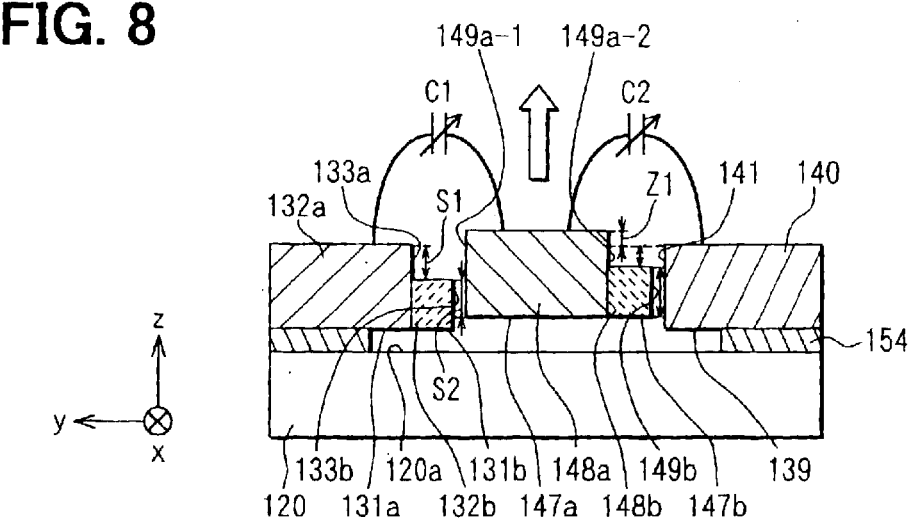
FIG. 8 is a cross-sectional view of the sensor of FIG. 4 showing a state that the movable electrode of FIG. 7 has moved along the positive direction along the z-axis of FIG. 4.

When a force that is related to a physical quantity such as an acceleration acts on the weight 146 of the sensor 101 in FIG. 4 in the positive direction of the z-axis, the weight 146 is displaced with expansions of the springs 147a, 147b, which are located on two ends of the weight 146. Provided that each of the movable electrode beams 148, which extend out of the weight 146, is displaced by Z1 in the positive direction of the z-axis, as shown in FIG. 8, a first area S1, or the area at which each of the first movable electrode portion first electrode-confronting surfaces 149a-1 and each of the corresponding first fixed electrode portion electrode-confronting surfaces 133a overlap, would remain the same before and after the displacement. That is, the first area S1 is constant. However, a second area S2, or the area at which each of the first movable electrode portion first electrode-confronting surfaces 149a-1 and each of the corresponding second fixed electrode portion electrode-confronting surfaces 133b overlap, would decrease after the displacement.

That is, when the movable electrodes 148 are displaced in the positive direction of the z-axis, the second areas S2 decrease while the first areas S1 is constant. Therefore, as shown in FIG. 11, the first direction first total sum D11, or the first total sum D1 when the movable electrodes 148 are displaced toward the positive direction of the z-axis, decreases at a first reduction rate.

Figure 13:
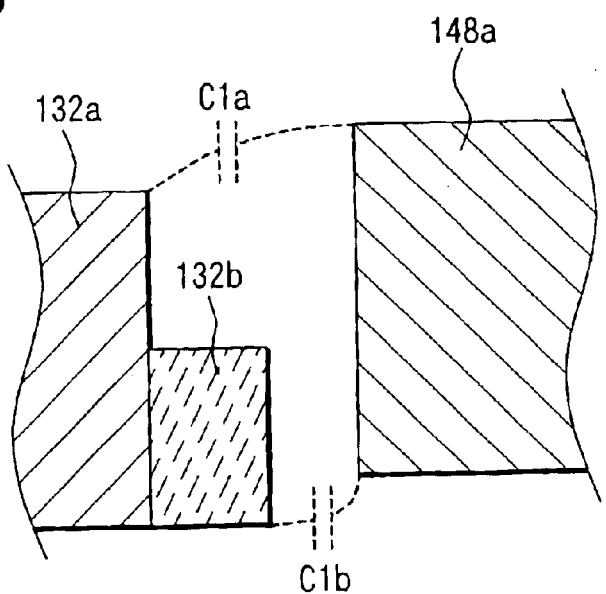
FIG. 13 is a schematic partial cross-sectional view of one of the movable electrode beams and the corresponding first fixed electrode beam in FIG. 7, showing the fringe capacitances formed between the electrodes due to the fringe effect.

As shown in FIG. 13, the first capacitance C1 includes a first fringe capacitance C1a and a second fringe capacitance C1b, which are formed due to the fringe effect between each of the first fixed electrode beams 132 and each of the corresponding movable electrode beams 148.

However, the first direction first total sum D11 decreases so steeply, in other word, the first reduction rate is so high, that even if the first and second fringe capacitances C1a, C1b are added, the overall capacitance C1 decreases as shown in FIG. 12 when the movable electrodes 148 are displaced from the original position before the displacement, where the displacement along the z-axis is 0 μm, toward the positive direction along the z-axis. Nevertheless, as shown in FIG. 12, the overall capacitance C1 decreases slightly more gradually when the displacement is small, or when the displacement along the z-axis is within the range from 0 to 3 μm, because of the contribution from the fringe capacitances C1a, C1b.

Figure 9:
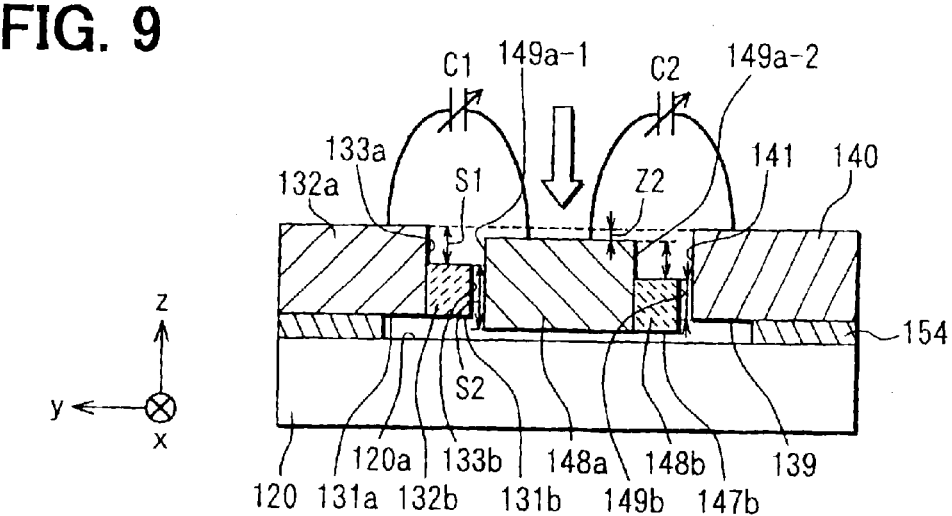
FIG. 9 is a cross-sectional view of the sensor of FIG. 4 showing a state that the movable electrode of FIG. 7 has moved along the negative direction along the z-axis of FIG. 4.

On the other hand, when the force acts on the weight 146 of the sensor 101 in FIG. 4 in the negative direction of the z-axis, the weight 146 is also displaced with expansions of the springs 147a, 147b. Provided that each of the movable electrode beams 148 are displaced by Z2 in the negative direction along the z-axis, as shown in FIG. 9, the first area S1 decrease by the displacement. However, the second area S2 remains the same before and after the displacement. That is, the second area S2 is constant.

That is, when the movable electrodes 148 are displaced in the negative direction of the z-axis, the first areas S1 decrease while the second areas S2 is constant. Therefore, as shown in FIG. 11, the second direction first total sum D12, or the first total sum D1 when the movable electrodes 148 are displaced toward the negative direction of the z-axis, decreases at a second reduction rate that is lower than the first reduction rate. However, within a certain range of displacement, the first capacitance C1 would increase due to the contribution from the fringe capacitances C1a, C1b, when the movable electrodes 148 are displaced from the original position before the displacement, where the displacement along the z-axis is 0 μm, toward the negative direction of the z-axis.

When the displacement toward the negative direction of the z-axis exceeds a certain magnitude, the first capacitance C1 begins to decrease because the fringe capacitances C1a, C1b begin to decrease gradually. In FIG. 12, the range of displacement in the negative direction of the z-axis is only shown up to −2 μm. However, if the magnitude of the displacement were to exceed −2 μm in the negative direction, the first capacitance C1 would reach a maximum value at around −3 μm, and the first capacitance C1 would begin to decrease with a displacement further toward the negative direction of the z-axis. In other words, the first capacitance C1 is maximized at a position comparable to one third to one half of the third length T3 (7.5 μm), which is the length of the second fixed electrode portion electrode-confronting surface 133b along the z-axis.

Therefore, in the sensor 101 of FIG. 4, as long as the movable electrodes 148 is displaced to a position the displacement value of which is greater than approximately −3 μm, the first capacitance C1 decreases when the movable electrodes 148 are displaced from the original position toward the positive direction of the z-axis, while the first capacitance C1 increases when the movable electrodes 148 are displaced toward the negative direction of the z-axis. Therefore, it is possible to detect in which direction along the z-axis the movable electrodes 148 are being displaced. Furthermore, when the movable electrodes 148 are displaced toward the positive direction of the z-axis, the first capacitance C1 decreases roughly proportionately. When the movable electrodes 148 are displaced toward the negative direction of the z-axis, the first capacitance C1 increases roughly proportionately. Therefore, the magnitude of the physical quantity can also be measured accurately to some extent from the magnitude of displacement along the z-axis.

On the other hand, the second total sum D2 and the second capacitance C2 between each of the movable electrode beams 148 and each of the corresponding second fixed electrode beams 140 behaves in the opposite manner as the first total sum D1 and the first capacitance C1 do. That is, as shown in FIG. 11, the first direction second total sum D21, or the second total sum D2 when the movable electrodes 148 are displaced toward the positive direction of the z-axis, decreases at a third reduction rate that is smaller than a fourth reduction rate, at which the second direction second total sum D22, or the second total sum D2 when the movable electrodes 148 are displaced toward the negative direction of the z-axis, decreases. Furthermore, as shown in FIG. 11, the first reduction rate of the first direction first total sum D11 is greater than the third reduction rate of the first direction second total sum D21. The second reduction rate of the second direction first total sum D12 is smaller than the fourth reduction rate of the second direction second total sum D22.

Furthermore, as shown in FIG. 12, when the movable electrodes 148 are displaced from the original position toward the positive direction of the z-axis, the second capacitance C2 increases as the displacement increases up to about 3 μm. When the displacement in the positive direction of the z-axis exceeds 3 μm, the second capacitance C2 begins to decrease. When the movable electrodes 148 are displaced from the original position toward the negative direction along the z-axis, the second capacitance C2 decreases.

As shown in FIG. 12, the difference ΔC, or (C1−C2), between the first and second capacitance C1, C2 decreases when the movable electrodes 148 are displaced from the original position toward the positive direction of the z-axis. On the other hand, the capacitance difference ΔC increases when the movable electrodes 148 are displaced toward the negative direction of the z-axis from the original position.

Therefore, it is possible to detect in which direction along the z-axis the movable electrodes 148 are being displaced on the basis of whether the capacitance difference ΔC is increasing or decreasing. When the movable electrodes 148 are displaced toward the positive direction of the z-axis due to the force related to a physical quantity to be measured, the capacitance difference ΔC decreases substantially proportionately. On the other hand, when the movable electrodes 148 are displaced toward the negative direction of the z-axis, the capacitance difference ΔC increases substantially proportionately. As shown in FIG. 12, the linearity of the capacitance difference ΔC is so excellent that it is possible to measure the magnitude of the physical quantity with a high accuracy on the basis of the magnitude of the displacement along the z-axis.

Incidentally, the capacitance difference ΔC can be obtained using any publicly known differential means such as an operational amplifier and other differential circuits.

The reason why the linearity of the capacitance difference ΔC is excellent is that the noises in the capacitance C1, C2 are compensated. In addition, the fringe capacitances C1a, C1b, which are used for detecting the physical quantity by the first capacitance C1 alone, is also compensated. In other words, the capacitance difference ΔC corresponds to the difference ΔD between the total sums D1, D2 in FIG. 11, in which neither the noises nor the fringe effect are taken into consideration. In FIG. 11, when the movable electrodes 148 are displaced in either of the directions along the z-axis, the total sums D1, D2 decrease linearly, or proportionately. Therefore, the difference ΔD between the total sums D1, D2 also changes linearly.

As shown in FIG. 12, according to the simulation performed by the inventors of the present invention, the difference ΔC between the capacitances C1, C2 exhibits a non-linearity of as small as 0.07%, when the range of displacement of the movable electrodes 148 along the z-axis is from −1 μm to +1 μm. Here, the non-linearity refers to the ratio by which the difference ΔC deviates from an ideal proportional relationship, or an ideal linear line, within the above range of displacement. In addition, in the sensor 101 of FIG. 4, the physical quantity can be detected on the basis of the sum of a plurality of the first capacitances C1, or a plurality of the second capacitances C2, or a plurality of the capacitance difference ΔC. Therefore, the sensor 101 of FIG. 4 is capable of measuring the physical quantity with a relatively high sensitivity.

Figure 14:
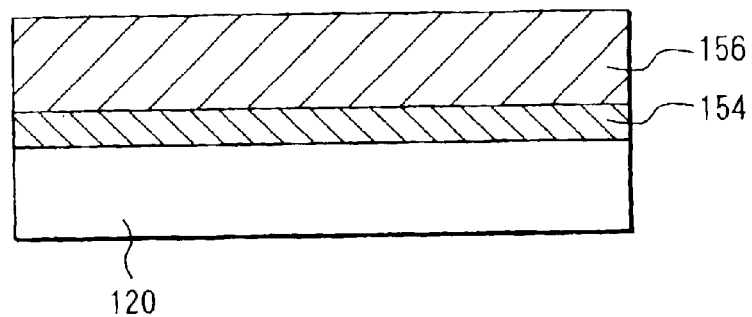
FIG. 14 is a schematic partial cross-sectional view of the portion shown in FIG. 7 at a step in a manufacturing process of the sensor in FIG. 4.

Next, a method for manufacturing the fixed electrode beams 132, 140 and the movable electrode beams 148, which are located between the fixed electrode beams 132, 140, will be described. Firstly, as shown in FIG. 14, an SOI substrate (raw substrate) that includes a silicon substrate 120 (supporting layer), a silicon oxide layer 154 (sacrificial layer), and a silicon layer 156 (electrode layer) is formed such that the silicon oxide layer 154 is located between the silicon layer 156 and the silicon substrate 120.

Figure 15:
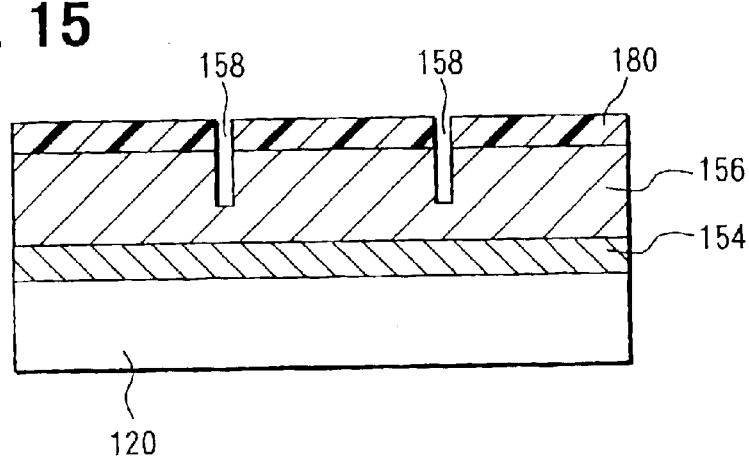
FIG. 15 is a schematic partial cross-sectional view of the portion shown in FIG. 7 at another step in the manufacturing process of the sensor in FIG. 4.
Figure 16:
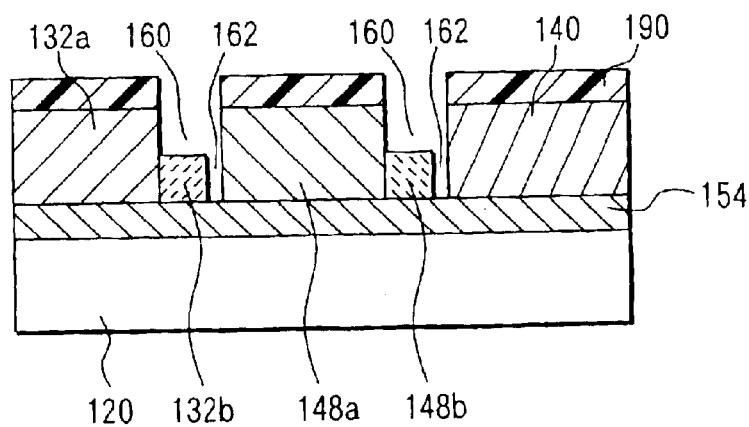
FIG. 16 is a schematic partial cross-sectional view of the portion shown in FIG. 7 at another step in the manufacturing process of the sensor in FIG. 4.

Next, as shown in FIG. 15, first predetermined portions of the silicon layer 156 are removed by, for example, dry etching such as reactive ion etching (RIE) using a resist 180 as a mask to form first trenches 158, which extend orthogonally from a surface of the silicon layer 156 toward the silicon oxide layer 154 with a depth that is approximately half of the thickness of the silicon layer 156. Next, as shown in FIG. 16, second predetermined portions of the silicon active layer 156 are removed by, for example, dry etching down to approximately half the thickness of the silicon layer 156 in some areas and down to the silicon oxide layer 154 below the first trenches 158 using a resist 190 as a mask to form second trenches 160 and third trenches 162, which extend orthogonally toward the silicon oxide layer 154. With dry etching such as RIE, the silicon layer 156 is readily anisotropically etched in the direction orthogonal to the surface of the silicon layer 156 toward the silicon oxide layer 154.

Next, the silicon oxide layer 154 is partially etched at the portion located between the movable electrode unit 142 and the silicon substrate 120 using, for example, HF aqueous solution through the second trenches 160 and the third trenches 162. With the partial etching of the silicon oxide layer 154, the semiconductor physical quantity sensor 101 shown in FIG. 4 is formed.

Second Embodiment

Figure 17:
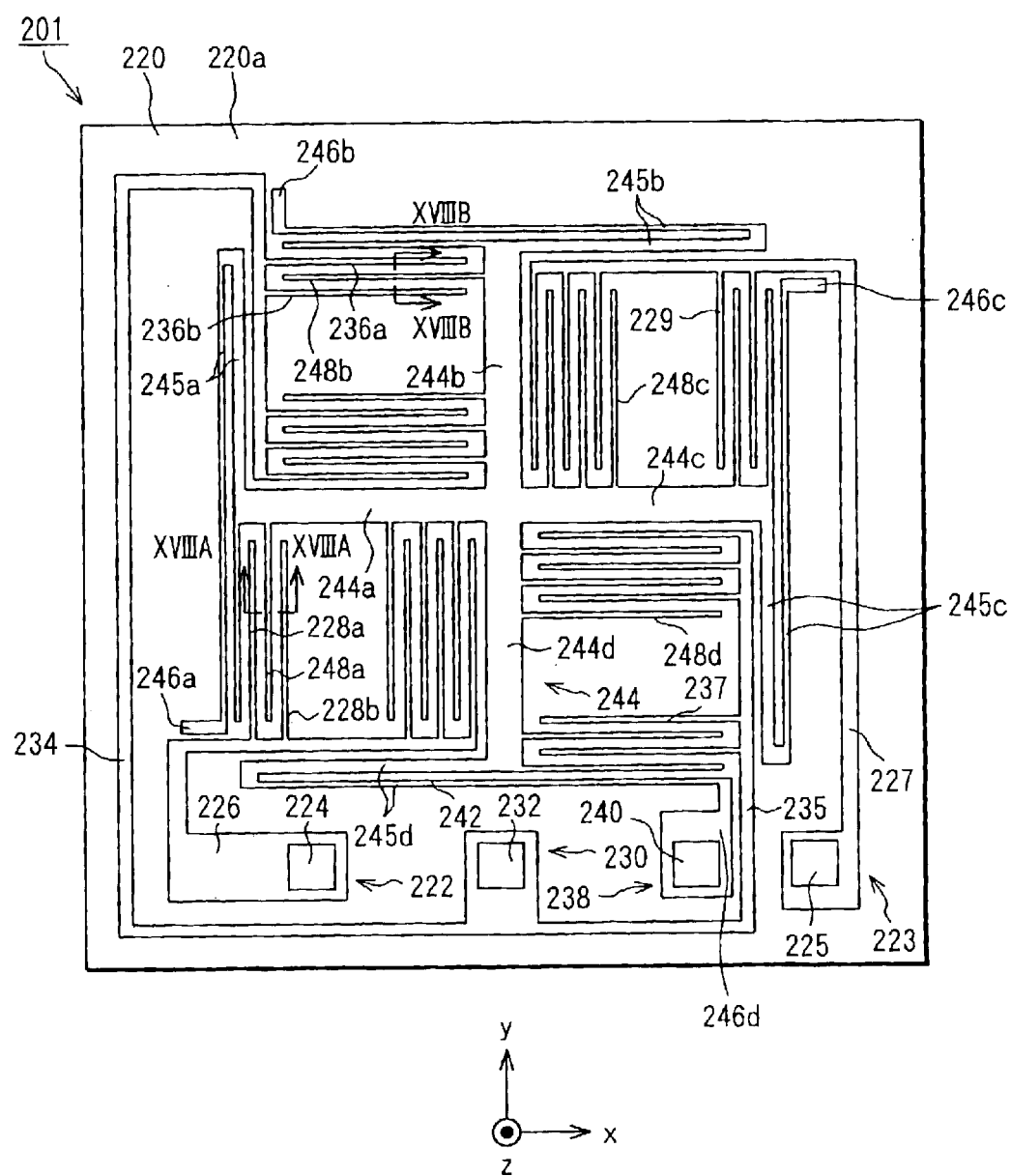
FIG. 17 is a schematic plan view of a semiconductor physical quantity sensor according to a second embodiment.

As shown in FIG. 17, a semiconductor physical quantity sensor 201 according to a second embodiment has an SOI structure and is composed of an active layer, an insulating intermediate layer, and a supporting substrate 220, although the insulating intermediate layer is not illustrated in the figure. The active layer and the supporting substrate 220 are made of silicon, and the insulating intermediate layer is made of silicon oxide.

As shown in FIG. 17, the active layer includes a movable electrode unit 238, a first fixed electrode unit 222, a second fixed electrode unit 230, and a third fixed electrode units 223. The movable electrode unit 238 is located above a surface 220a of the supporting substrate 220 and includes a first weight 244a, a second weight 244b, a third weight 244c, a fourth weight 244d, a first comb-shaped movable electrode 248a, a second comb-shaped movable electrode 248b, a third comb-shaped movable electrode 248c, a fourth comb-shaped movable electrode 248d, a first spring 245a, a second spring 245b, a third spring 245c, a fourth spring 245d, a first anchor 246a, a second anchor 246b, a third anchor 246c, a fourth anchor 246d, and an electrode terminal 240. The four weights 244a, 244b, 244c, 244d are arranged in the shape of a cross. Each of the movable electrodes 248a, 248b, 248c, 248d includes five movable electrode beams 248a, 248b, 248c, 248d. Each group of the movable electrode beams 248a, 248b, 248c, 248d extends orthogonally out of each of the corresponding weights 244a, 244b, 244c, 244d in parallel to the surface 220a of the supporting substrate 220.

Each of the springs 245a, 245b, 245c, 245d has a bent shape and extends out of an end of each of the corresponding weights 244a, 244b, 244c, 244d. Although not shown in the figure, the anchors 246a, 246b, 246c, 246d are fixed onto the insulating intermediate layer. The weights 244a, 244b, 244c, 244d and the movable electrodes 248a, 248b, 248c, 248d can be displaced along the directions that are substantially orthogonal to the surface 220a of the supporting substrate 220, or along the z-axis of FIG. 17. Although not shown in the figure, the fixed electrode units 222, 223, 230 are fixed to the supporting substrate 220 through the insulating intermediate layer.

In the figures that are referred hereinafter, the z-axis is the one that runs along the directions that are substantially orthogonal to the surface 220a of the substrate 220. The x-axis and the y-axis are substantially parallel to the surface 220a of the substrate 220, and the x-axis and the y-axis are substantially orthogonal to each other. The x, y, and z-axes are substantially orthogonal to one another. With respect to the x and y-axes, the directions of arrows in FIG. 17 shall be the positive directions, and the opposite directions shall be the negative directions. With respect to the z-axis, the positive direction is the one that runs from the rear side to the front side of FIG. 17, and the opposite direction shall be the negative direction.

The weights 244a, 244b, 244c, 244d, the movable electrodes 248a, 248b, 248c, 248d, the springs 245a, 245b, 245c, 245d are supported by the anchors 246a, 246b, 246c, 246d and float above the supporting substrate 220. With the above structure, the weights 244a, 244b, 244c, 244d and the movable electrodes 248a, 248b, 248c, 248d can readily move along the z-axis. Therefore, it is not necessary needed to make the length of the springs 245a, 245b, 245c, 245d along the z-axis smaller than the lengths along the x-axis and the y-axis.

The first fixed electrode unit 222 includes a fixed portion 226, a comb-shaped fixed electrode 228, and an electrode terminal 224. The second fixed electrode unit 230 includes two fixed portions 234, 235, two comb-shaped fixed electrodes 236, 237, and an electrode terminal 232. The third fixed electrode unit 223 includes a fixed portion 227, a comb-shaped fixed electrode 229, and an electrode terminal 225. Hereinafter, the fixed electrode 228 of the first fixed electrode unit 222, one of the fixed electrodes 236 of the second fixed electrode unit 230, the fixed electrode 229 of the third fixed electrode unit 223, and the other of the fixed electrodes 237 of the second fixed electrode unit 230 are referred to the first to fourth fixed electrodes 228, 236, 229, 237, respectively.

The first fixed electrode 228 includes five first fixed electrode beams 228, 228a, 228b, which extend toward the positive direction along the y-axis. The first fixed electrode 228 interleaves with the first movable electrode 248a, which extend toward the negative direction along the y-axis. The second fixed electrode 236 includes five second fixed electrode beams 236, 236a, 236b, which extend toward the positive direction along the x-axis. The second fixed electrode 236 interleaves with the second movable electrode 248b, which extend toward the negative direction along the x-axis.

The third fixed electrode 229 includes five third fixed electrode beams 229, which extend toward the negative direction along the y-axis. The third fixed electrode 229 interleaves with the third movable electrode 248c, which extend toward the positive direction along the y-axis. The fourth fixed electrode 237 includes five fourth fixed electrode beams 237, which extend toward the negative direction along the x-axis. The fourth fixed electrode 237 interleaves with the fourth movable electrode 248d, which extend toward the positive direction along the x-axis. Although not illustrated in the figure, the fixed electrodes 228, 229, 236, 237 float above the supporting substrate 220.

With the structure of the sensor 201 in FIG. 17, a large number of movable electrode beams 248a, 248b, 248c, 248d and a large number of fixed electrode beams 228, 228a, 228b, 229, 236, 236a, 236b, 237 can be packed into each of four areas, which is defined by two adjoining weights 244a, 244b, 244c, 244d substantially in the shape of a square. As a result, a compact yet highly sensitive physical quantity sensor can be realized. Furthermore, the weights 244a, 244b, 244c, 244d and the movable electrodes 248a, 248b, 248c, 248d are substantially point symmetrical, as shown in FIG. 17. Therefore, the displacement of the weights 244a, 244b, 244c, 244d and the movable electrodes 248a, 248b, 248c, 248d is relatively stable, and a stable sensitivity is achieved.

In the sensor 201 of FIG. 17, the first movable electrode 248a and the first fixed electrode 228 respectively have the same structures as the third movable electrode 248c and the third fixed electrode 229, and the second movable electrode 248b and the second fixed electrode 236 respectively have the same structures as the fourth movable electrode 248d and the fourth fixed electrode 237. Therefore, the structures of the movable electrodes 248a, 248b, 248c, 248d and the fixed electrodes 228, 229, 236, 237 will be described using one of the first movable electrode beams 248a, one of the second movable electrode beams 248b, two of the first fixed electrode beams 228a, 228b, and two of the second fixed electrode beams 236a, 236b.

Figure 18A:
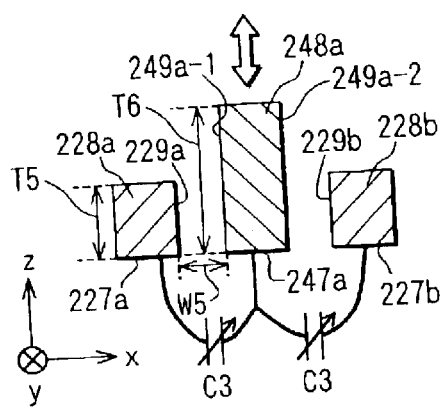
FIG. 18A is a schematic cross-sectional view of a portion of the sensor of FIG. 17 taken along a line XVIIIA—XVIIIA in FIG. 17.

As shown in FIG. 18A, the two first fixed electrode beams 228a, 228b respectively have first fixed electrode beam substrate-confronting surfaces 227a, 227b, and the first movable electrode beam 248a has a first movable electrode beam substrate-confronting surface 247a. The first fixed electrode beam substrate-confronting surfaces 227a, 227b and the first movable electrode beam substrate-confronting surface 247a are planar and confront parallel the substrate surface 220a. Furthermore, the substrate-confronting surfaces 227a, 227b, 247a are placed substantially at the same level along the z-axis before the first movable electrode 248a is displaced.

As shown in FIG. 18A, the two fixed electrode beams 228a, 228b respectively have first fixed electrode beam electrode-confronting surfaces 229a, 229b, and the first movable electrode beams 248a has a first movable electrode beam first electrode-confronting surface 249a-1 and a first movable electrode beam second electrode-confronting surface 249a-2. The electrode-confronting surfaces 229a, 229b, 249a-1, 249a-2 are substantially rectangular, parallel to the z-axis, and planar. The surfaces on both sides of each of the electrode-confronting surfaces 229a, 229b, 249a-1, 249a-2 are substantially parallel to the z-axis, too.

Each of the first fixed electrode beam electrode-confronting surfaces 229a, 229b has a first length T5, which is specifically 7.5 μm, along the z-axis. The first movable electrode beam first electrode-confronting surface 249a-1 and the first movable electrode beam second electrode-confronting surface 249a-2 have a second length T6, which is specifically 15 μm, along the z-axis. That is, the fist length T5 is one half of the second length T6. A first distance W5, or the distance between the first movable electrode beam first electrode-confronting surface 249a-1 and the corresponding first fixed electrode beam electrode-confronting surface 229a, is 3 μm. The distance between the first movable electrode beam second electrode-confronting surface 249a-2 and the corresponding first fixed electrode beam electrode-confronting surface 229b is the same as the first distance W5.

Figure 18B:
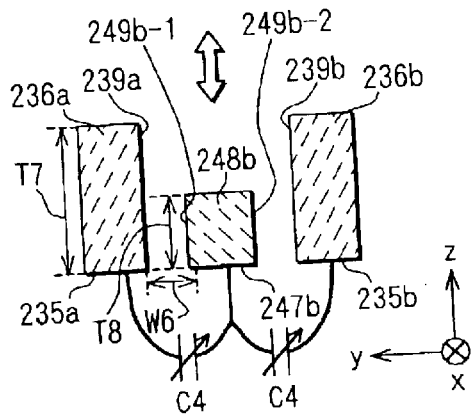
FIG. 18B is a schematic cross-sectional view of a portion of the sensor of FIG. 17 taken along a line XVIIIB—XVIIIB in FIG. 17.

As shown in FIG. 18B, the two fixed electrode beams 236a, 236b respectively have second fixed electrode beam substrate-confronting surfaces 235a, 235b, and the second movable electrode beam 248b has a second movable electrode beam substrate-confronting surface 247b. The second fixed electrode beam substrate-confronting surfaces 235a, 235b and the second movable electrode beam substrate-confronting surface 247b are planar and confront parallel the substrate surface 220a. Furthermore, the substrate-confronting surfaces 235a, 235b, 247b are placed substantially at the same level along the z-axis before the second movable electrode 248b is displaced.

As shown in FIG. 18B, the two second fixed electrode beams 236a, 236b respectively have second fixed electrode beam electrode-confronting surfaces 239a, 239b, and the second movable electrode beam 248b has a second movable electrode beam first electrode-confronting surface 249b-1 and a second movable electrode beam second electrode-confronting surface 249b-2. The electrode-confronting surfaces 239a, 239b, 249b-1, 249b-2 are substantially rectangular, parallel to the z-axis, and planar. The surfaces on both sides of each of the electrode-confronting surfaces 239a, 239b, 249b-1, 249b-2 are substantially parallel to the z-axis, too.

Each of the second fixed electrode beam electrode-confronting surfaces 239a, 239b has a third length T7, which is specifically 15 µm, along the z-axis. The second movable electrode beam first electrode-confronting surface 249b-1 and the first movable electrode beam second electrode-confronting surface 249b-2 have a fourth length T8, which is specifically 7.5 µm, along the z-axis. That is, the fourth length T8 is one half of the third length T7.

A sixth distance W6, or the distance between the second movable electrode beam first electrode-confronting surface 249b-1 and the corresponding first fixed electrode beam electrode-confronting surface 239a is 3 µm. That is, the second distance W6 is equal to the first distance W5. The distance between the second movable electrode beam second electrode-confronting surface 249b-2 and the corresponding second fixed electrode beam electrode-confronting surface 239b is the same as the sixth distance W6.

Although not illustrated in the figure, one of the first fixed electrode beams 228a has one more electrode-confronting surface, which is opposite to one of the first fixed electrode beam electrode-confronting surfaces 229a, and one of the second fixed electrode beams 236a has one more electrode-confronting surface, which is opposite to one of the second fixed electrode beam electrode-confronting surface 239a.

As shown in FIG. 17, three movable electrode beams of each of the movable electrodes 248a, 248b, 258c, 248d have respectively two electrode-confronting surfaces, and so do three fixed electrode beams of each of the fixed electrodes 228, 229, 236, 237. Therefore, the sensor 201 of FIG. 17 is relatively compact with a relatively high total capacitance and high sensitivity.

Next, the operation of the semiconductor physical quantity sensor 201 of FIG. 17 will be described in detail using one of the first movable electrode beams 248a, one of the second movable electrode beams 248b, two of the first fixed electrode beams 228a, 228b, and two of the second electrode beams 236a, 236b.

Figure 19A:
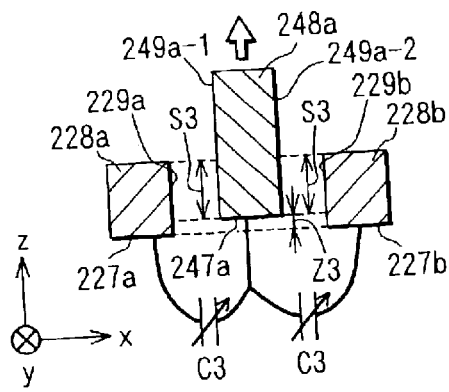
FIG. 19A is a schematic cross-sectional view of the sensor of FIG. 17 showing a state that the movable electrode of FIG. 18A has moved along the positive direction along the z-axis of FIG. 17.
Figure 19B:
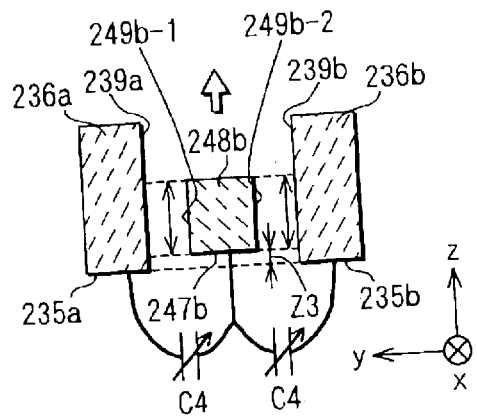
FIG. 19B is a schematic cross-sectional view of the sensor of FIG. 17 showing a state that the movable electrode of FIG. 18B has moved along the positive direction along the z-axis of FIG. 17.

When a force that is related to a physical quantity such as an acceleration acts on each of the weights 244a, 244b, 244c, 244d of the sensor 201 in FIG. 17 in the positive direction along the z-axis, each of the weights 244a, 244b, 244c, 244d is displaced with expansions of the springs 245a, 245b, 245c, 245d, each of which is located at the end of each of the corresponding weights 244a, 244b, 244c, 244d. Provided that the first movable electrode beam 248a is displaced by Z3 in the positive direction along the z-axis as shown in FIG. 19A, a third area S3, or the area at which the first movable electrode beam first electrode-confronting surface 249a-1 and the corresponding first fixed electrode beam electrode-confronting surface 229a overlap, decreases. The area at which the first movable electrode beam second electrode-confronting surface 249a-2 and the corresponding first fixed electrode beam electrode-confronting surface 229b overlap is equal to the third area S3 and changes in the same manner. Therefore, the reduction rate of the area-distance quotient (S3/W5) becomes a positive value.

Figure 20A:
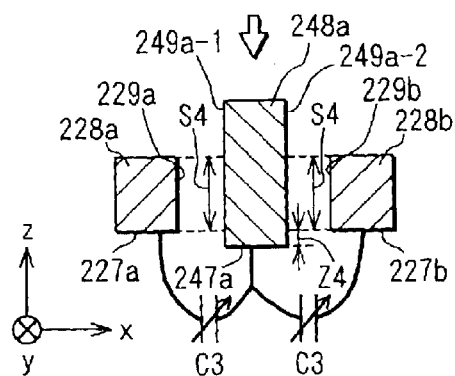
FIG. 20A is a schematic cross-sectional view of the sensor of FIG. 17 showing a state that the movable electrode of FIG. 18A has moved in the negative direction along the z-axis of FIG. 17.
Figure 20B:
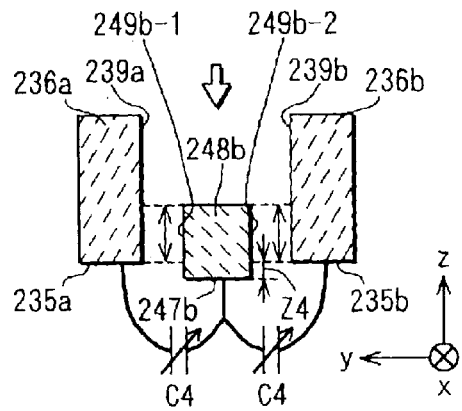
FIG. 20B is a schematic cross-sectional view of the sensor of FIG. 17 showing a state that the movable electrode of FIG. 18B has moved in the negative direction along the z-axis of FIG. 17.

On the other hand, when the force acts on each of the weights 244a, 244b, 244c, 244d of the sensor 201 in FIG. 17 in the negative direction along the z-axis, each of the weights 244a, 244b, 244c, 244d is also displaced with expansions of the springs 245a, 245b, 245c, 245d. Provided that each of the movable electrode beams 248a of the movable electrode 248a is displaced by Z4 in the negative direction along the z-axis, as shown in FIG. 20A, a fourth area S4, or the area at which the first movable electrode beam first electrode-confronting surface 249a-1 and the corresponding first fixed electrode beam electrode-confronting surface 229a overlap, remains the same before and after the displacement. That is, fourth area S4 is constant. The area at which the first movable electrode beam second electrode-confronting surface 249a-2 and the corresponding first fixed electrode beam electrode-confronting surface 229b overlap is equal to the fourth area S4 and changes in the same manner. Therefore, the reduction rate of the area-distance quotient (S4/W5) becomes zero.

When the first movable electrode 248a is displaced toward the positive direction along the z-axis, a third capacitance C3, or the capacitance between the first movable electrode beam 248a and the corresponding first fixed electrode beam 228a, decreases even though the fringe capacitance due to the fringe effect is added, and so does another third capacitance C3, or the capacitance between the first movable electrode beam 248a and the corresponding first fixed electrode beam 228b. On the other hand, when the first movable electrode 248a is displaced toward the negative direction along the z-axis, the third capacitances C3 increase due to the fringe capacitance as long as the magnitude of the displacement is within a predetermined range.

With the above mechanism, it is possible to detect in which direction along the z-axis the first movable electrode 248a is being displaced on the basis of the increase and the decrease of the third capacitances C3. Furthermore, when the first movable electrode 248a is displaced toward the positive direction along the z-axis under the force, the third capacitances C3 decrease roughly proportionately. In addition, when the first movable electrode 248a is displaced toward the negative direction along the z-axis, the third capacitances C2 increase roughly proportionately as long as the magnitude of the displacement is within a predetermined range. As a result, the magnitude of the physical quantity can be measured accurately to some extent from the magnitude of displacement along the z-axis.

On the other hand, the area-distance quotient between the second movable electrode beam first electrode-confronting surface 249b-1 and the corresponding second fixed electrode beam electrode-confronting surface 239a and a fourth capacitance C4, or the capacitance between the second movable electrode beam 248b and the corresponding second fixed electrode beam 236a behave in the opposite manner as the area-distance quotient between the first movable electrode beam 248a and the corresponding first fixed electrode beam 228a and the third capacitance C3 respectively do.

Therefore, as well as in the sensor 101 of FIG. 4, the difference ΔC, or (C3−C4), between the third and fourth capacitance C3, C4 decreases when the first and second movable electrodes 248a, 248b are displaced from the original position toward the positive direction along the z-axis. On the other hand, the capacitance difference ΔC would increase when the first and second movable electrodes 248a, 248b are displaced toward the negative direction along the z-axis from the original position. For this reason, it is possible to detect in which direction along the z-axis the movable electrodes 248a, 248b are being displaced on the basis of whether the capacitance difference ΔC is increasing or decreasing.

When the movable electrodes 248a, 248b are displaced toward the positive direction along the z-axis due to the force related to a physical quantity to be measured, the capacitance difference ΔC decreases substantially proportionately. On the other hand, when the movable electrodes 248a, 248b are displaced toward the negative direction along the z-axis, the capacitance difference ΔC increases substantially proportionately. The linearity of the capacitance difference ΔC is so excellent that it is possible to measure the magnitude of the physical quantity with a high accuracy on the basis of the magnitude of the displacement along the z-axis.

According to the simulation performed by the inventors of the present invention, the third capacitance C3 and the difference ΔC between the capacitances C3, C4 respectively exhibit a non-linearity of as small as 8.3% and a non-linearity of as small as 0.7%, when the range of displacement of the movable electrodes 248a, 248b along the z-axis is from −1 μm to +1 μm.

Figure 21:
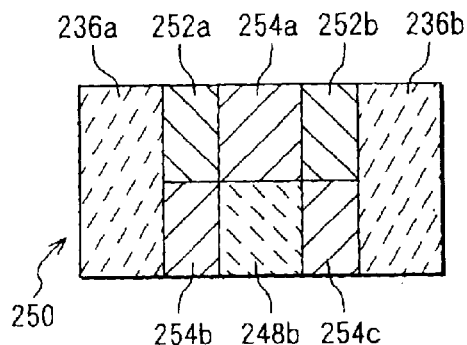
FIG. 21 is a schematic partial cross-sectional view of the portion of the sensor of FIG. 17 shown in FIG. 18B, showing a procedure to form the electrodes of the sensor in FIG. 17.
Figure 22:
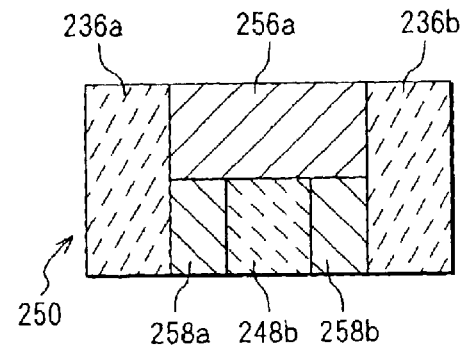
FIG. 22 is a schematic partial cross-sectional view of the portion of the sensor of FIG. 17 shown in FIG. 18B, showing another procedure to form the electrodes of the sensor in FIG. 17.
Figure 23:
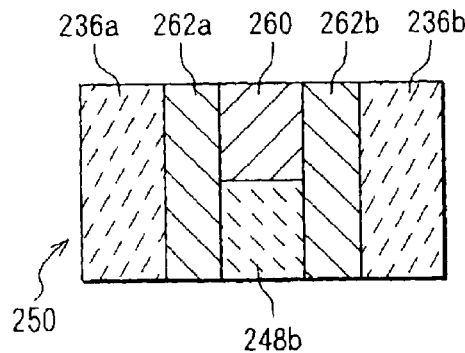
FIG. 23 is a schematic partial cross-sectional view of the portion of the sensor of FIG. 17 shown in FIG. 18B, showing another procedure to form the electrodes of the sensor in FIG. 17.

Next, a plurality of methods for manufacturing the movable electrode beams 248a, 248b, 248c, 248d and the fixed electrode beams 228, 228a, 228b, 229, 236, 236a, 236b, 237 will be described using one of the second movable electrode beams 248b and two of the second electrode beams 236a, 236b, which are shown in FIG. 18B. As shown in FIGS. 21 to 23, the electrode beams 248b, 236a, 236b are formed from a silicon layer 250. Although not illustrated in the figure, the silicon layer 250 is located on a side of an SOI substrate.

In a first method, as shown in FIG. 21, first removed portions 252a, 252b (first predetermined portion) are simultaneously removed off by, for example, dry etching using a resist as a mask. Then, using a resist as a mask again, second removed portion 254a and third removed portions 254b, 254c (second predetermined portion) are simultaneously removed off by, for example, dry etching.

In a second method, as shown in FIG. 22, a fourth removed portion 256a (first predetermined portion) is removed off by, for example, dry etching using a resist as a mask. Then, using a resist as a mask again, fifth removed portions 258a, 258b (second predetermined portion) are simultaneously removed off by, for example, dry etching.

In a third method, as shown in FIG. 23, sixth removed portions 262a, 262b (first predetermined portion) are simultaneously removed off by, for example, dry etching using a resist as a mask. Then, using a resist as a mask again, a seventh removed portion 260 (second predetermined portion) is removed off by, for example, dry etching. Alternatively, the seventh removed portion 260 may be removed in advance of removing the sixth removed portions 262a, 262b.

Third Embodiment

Figure 24:
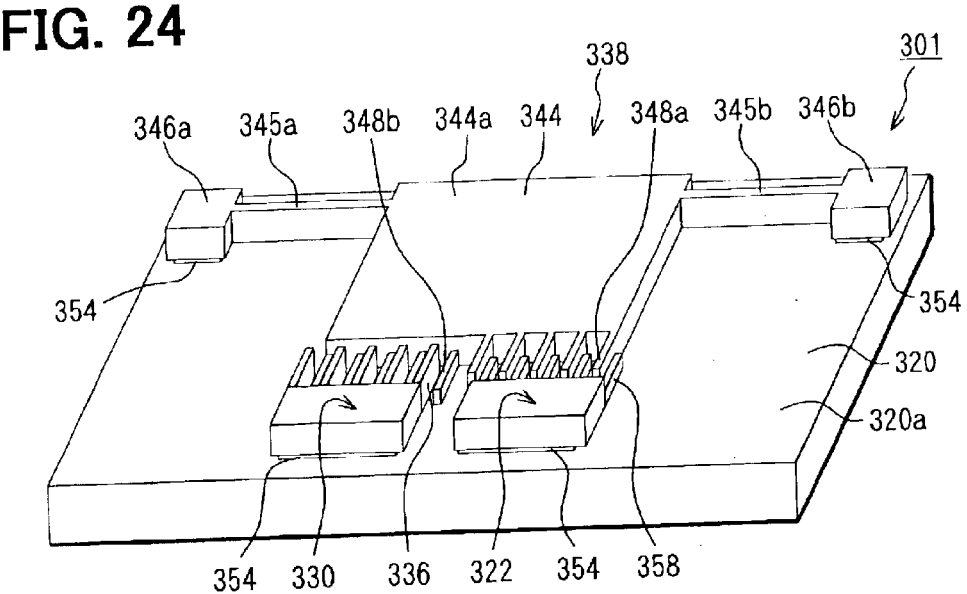
FIG. 24 is a schematic perspective view of a semiconductor optical mirror according to a third embodiment.

As shown in FIG. 24, a semiconductor optical mirror 301 according to a third embodiment has an SOI structure and is composed of an active layer, an insulating intermediate layer 354, and a supporting substrate 320. The active layer and the supporting substrate 320 are made of silicon, and the insulating intermediate layer 354 is made of silicon oxide.

As shown in FIG. 24, the active layer includes a movable electrode unit 338, a first fixed electrode unit 322 and a second fixed electrode unit 330. The movable electrode unit 338 is located above a surface 320a of the supporting substrate 320 and includes a weight 344, a first comb-shaped movable electrode 348a, a second comb-shaped movable electrode 348b, a first linking beam 345a, a second linking beam 345b, a first anchor 346a, and a second anchor 346b. The weight 344 includes a surface 344a that function as an optical mirror. Although not illustrated in the figure, the movable electrode unit 338 also includes an electrode terminal for electric connection. The first movable electrode 348a includes five first movable electrode beams 348a. The second movable electrode 348b includes five second movable electrode beams 348b. Each group of the movable electrode beams 348a, 348b extends out of the weight 344 in parallel to the surface 320a of the supporting substrate 320. The linking beams 345a, 345b extend out of the weight 344 in parallel to the surface 320a of the supporting substrate 320 and are on the same axis.

Each of the linking beams 345a, 345b is linked to the weight 444 and the corresponding anchor 346a, 346b. Each of the anchors 346a, 346b is fixed onto the insulating intermediate layer 354. The weight 344 and the movable electrodes 348a, 348b can be rotationally displaced around the axis, on which the linking beams 345a, 345b are located. The fixed electrode units 322, 330 are fixed to the supporting substrate 320 through the insulating intermediate layer 354.

The first fixed electrode unit 322 includes a comb-shaped first fixed electrode 328, which floats above the supporting substrate 320. The second fixed electrode unit 330 includes a comb-shaped second fixed electrode 336, which floats above the supporting substrate 320. Although not illustrated in the figure, each of the fixed electrode units 322, 330 also includes an electrode terminal for electric connection. The first fixed electrode 328 includes five first fixed electrode beams 328, which extend in parallel to the surface 320a of the supporting substrate 320. The first fixed electrode 328 interleaves with the first movable electrode 348a. The second fixed electrode 336 includes five second fixed electrode beams 336. The second fixed electrode 336 interleaves with the second movable electrode 348b.

The structural relation between the first movable electrode beams 348a and the first fixed electrode beams 328 is similar to that between the first movable electrode beams 248a and the first fixed electrode beams 228, 228a, 228b of FIG. 17, the structure of which is shown in FIG. 18A. On the other hand, the structural relation between the second movable electrode beams 348b and the second fixed electrode beams 336 is similar to that between the second movable electrode beams 248b and the second fixed electrode beams 236, 236a, 236b of FIG. 17, the structure of which is shown in FIG. 18B.

With the above electrode beam structure, when a potential difference is applied between the first movable electrode 348a and the first fixed electrode 328, the two electrodes 348a, 328 are electrostatically attracted. In addition, the electrostatic attraction that acts on the first movable electrode beams 348a forces the first movable electrode beams 348a to move toward the surface 320a from the initial position. On the other hand, when a potential difference is applied between the second movable electrode 348b and the second fixed electrode 336, the two electrodes 348b, 336 are electrostatically attracted. In addition, the electrostatic attraction that acts on the second movable electrode beams 348b forces the second movable electrode beams 348b to move away from the surface 320a from the initial position.

Therefore, it is possible to arbitrarily adjust the angle of the surface 344a, which function as an optical mirror, by controlling the potential difference that is applied between the first movable electrode 348a and the first fixed electrode 328 or between the second movable electrode 348b and the second fixed electrode 336.

Fourth Embodiment

Figure 25:
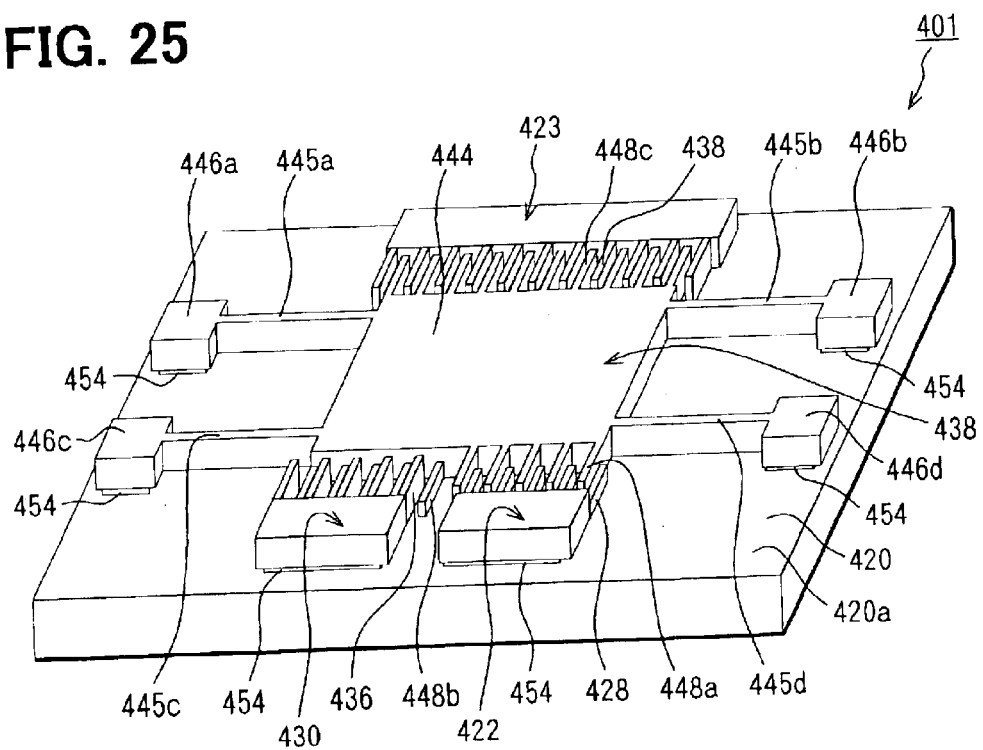
FIG. 25 is a schematic perspective view of a semiconductor vibration-type gyroscope according to a fourth embodiment.

As shown in FIG. 25, a semiconductor vibration-type gyroscope 401 according to a fourth embodiment has an SOI structure and is composed of an active layer, an insulating intermediate layer 454, and a supporting substrate 420. The active layer and the supporting substrate 420 are made of silicon, and the insulating intermediate layer 454 is made of silicon oxide.

As shown in FIG. 25, the active layer includes a movable electrode unit 438, a first fixed electrode unit 422 and a second fixed electrode unit 430, and a third electrode unit 423. The movable electrode unit 438 is located above a surface 420a of the supporting substrate 420 and includes a weight 444, a first comb-shaped movable electrode 448a, a second comb-shaped movable electrode 448b, a third comb-shaped movable electrode 448c, a first linking beam 445a, a second linking beam 445b, a third linking beam 445c, a fourth linking beam 445d, a first anchor 446a, a second anchor 446b, a third anchor 446c, and a fourth anchor 446d. Although not illustrated in the figure, the movable electrode unit 438 also includes an electrode terminal for electric connection. The first movable electrode 448a includes five first movable electrode beams 448a. The second movable electrode 448b includes five second movable electrode beams 448b. The third movable electrode 448c includes ten third movable electrode beams 448c. Each group of the movable electrode beams 448a, 448b, 448c extends out of the weight 444 in parallel to the surface 420a of the supporting substrate 420.

The linking beam 445a, 445b, 445c, 445d are substantially parallel to one another, and each of the linking beams 445a, 445b, 445c, 445d is linked to the weight 444 and the corresponding anchor 446a, 446b, 446c, 446d. Each of the anchors 446a, 446b, 446c, 446d is fixed onto the insulating intermediate layer 454. The weight 444 and the movable electrodes 448a, 448b, 448c can move orthogonally and parallel to the substrate surface 420a. The fixed electrode units 422, 430, 423 are fixed to the supporting substrate 420 through the insulating intermediate layer 454.

The first fixed electrode unit 422 includes a comb-shaped first fixed electrode 428, which floats above the supporting substrate 420. The second fixed electrode unit 430 includes a comb-shaped second fixed electrode 436, which floats above the supporting substrate 420. The third fixed electrode unit 423 includes a comb-shaped second fixed electrode 438, which floats above the supporting substrate 420. Although not illustrated in the figure, each of the fixed electrode units 422, 430, 423 also includes an electrode terminal for electric connection. The first fixed electrode 428 includes five first fixed electrode beams 428, which extend in parallel to the surface 420a of the supporting substrate 420. The first fixed electrode 428 interleaves with the first movable electrode 448a. The second fixed electrode 436 includes five second fixed electrode beams 436. The second fixed electrode 436 interleaves with the second movable electrode 448b. The third fixed electrode 438 includes eleven third fixed electrode beams 438. The third fixed electrode 438 interleaves with the third movable electrode 448c.

The structural relation between the first movable electrode beams 448a and the first fixed electrode beams 428 is similar to that between the first movable electrode beams 248a and the first fixed electrode beams 228, 228a, 228b of FIG. 17, the structure of which is shown in FIG. 18A. On the other hand, the structural relation between the second movable electrode beams 448b and the second fixed electrode beams 436 is similar to that between the second movable electrode beams 248b and the second fixed electrode beams 236, 236a, 236b of FIG. 17, the structure of which is shown in FIG. 18B.

With the above electrode beam structure, when a potential difference is applied between the first movable electrode 448a and the first fixed electrode 428, the two electrodes 448a, 428 are electrostatically attracted. In addition, the electrostatic attraction that acts on the first movable electrode beams 448a forces the first movable electrode beams 448a to move toward the surface 420a from the initial position. On the other hand, when a potential difference is applied between the second movable electrode 448b and the second fixed electrode 436, the two electrodes 448b, 436 are electrostatically attracted. In addition, the electrostatic attraction that acts on the second movable electrode beams 448b forces the second movable electrode beams 448b to move away from the surface 420a from the initial position.

Therefore, it is possible to vibrate the weight 444 with the first and second electrodes 448a, 448b along the directions substantially orthogonal to the substrate surface 420a by controlling the potential differences that are applied between the first movable electrode 448a and the first fixed electrode 428 and between the second movable electrode 448b and the second fixed electrode 436.

If the gyroscope 401 is rotated around an axis that is parallel to the surface 420a of the supporting substrate 420 and orthogonal to the longitudinal directions of the electrode beams 448a, 448b, 428, 436 while the weigh 444 is being vibrated along the directions substantially orthogonal to the substrate surface 420a in FIG. 25, another vibration due to Coriolis' force is generated in the weigh 444 substantially along the longitudinal directions of the electrode beams 448a, 448b, 428, 436. The vibration due to Coriolis' force oscillates the capacitance between the third fixed electrode 438 and the third movable electrode 448c. The capacitance oscillation can be detected by any publicly known method. Therefore, it is possible to measure the angular velocity of the rotation of the gyroscope 401 on the basis of the capacitance oscillation.

The sensors 101, 201, the optical mirror 301, and the gyroscope 401 are merely examples and do not limit the scope of the present invention. The present invention may be applied to variations of and modifications made to the sensors 101, 201, the optical mirror 301, and the gyroscope 401 described above.

For example, although the electrode-confronting surfaces of the movable electrodes and the fixed electrodes in the sensors 101, 201, the optical mirror 301, and the gyroscope 401 are rectangular as representatively shown in FIG. 10, as a matter of course, the shapes of the electrode-confronting surfaces are not limited to rectangle. For example, the shapes of the electrode-confronting surfaces may be triangle, and one side of the triangle may be parallel to the substrate surface. Alternatively, the electrode-confronting surfaces of the movable electrodes may be upside-down-T-shaped.

Although the movable electrodes and the fixed electrodes are made of single crystal silicon in the sensors 101, 201, the optical mirror 301, and the gyroscope 401, the electrodes may be made of other materials such as poly crystalline silicon.

The present invention is widely applicable to capacitive devices that include at least one pair of electrodes that form a capacitance therebetween. Furthermore, the artificial elements disclosed in the specification and the figures are not limited to the combinations in the claims of the present invention and may be of use discretely or in various combinations. With the arts disclosed in the specification and the figures, a multitude of objectives is achieved at the same time. The arts, however, have an artificial advantage even by achieving one objective among the multitude of objectives.

What is claimed is:

1. A capacitive device comprising:

a substrate;

a movable electrode, which is located above a surface of the substrate and is movable with respect to the substrate along directions that are substantially orthogonal to the surface, wherein the movable electrode includes a substrate-confronting surface, at which the movable electrode confronts the surface of the substrate, and an electrode-confronting surface; and a fixed electrode, which is stationary with respect to the substrate, wherein the fixed electrode includes a substrate-confronting surface, at which the fixed electrode confronts the surface of the substrate, and an electrode-confronting surface, wherein the substrate-confronting surfaces are substantially parallel to the surface of the substrate, wherein the substrate-confronting surfaces are substantially planar and substantially at the same level along the directions that are substantially orthogonal to the surface of the substrate before the movable electrode is displaced, wherein the electrode-confronting surfaces confront each other and are substantially orthogonal to the surface of the substrate, wherein when the movable electrode is displaced in a first direction that is substantially orthogonal to the surface of the substrate, the total sum of area-distance quotients in an overlap between the electrode-confronting surfaces remains substantially unchanged or decreases to provide a first reduction rate that is substantially zero or more, wherein when the movable electrode is displaced in a second direction that is substantially opposite to the first direction, the total sum of area-distance quotients remains substantially unchanged or decreases to provide a second reduction rate that is substantially zero or more, and wherein the reduction rates are different from each other.

2. The capacitive device according to claim 1, wherein the movable electrode is displaced in response to an inertial force applied to the movable electrode to vary a capacitance formed between the movable electrode and the fixed electrode, wherein the inertial force is correlated to a physical quantity to be detected by the capacitive device, and wherein the physical quantity is detected on the basis of the capacitance.

3. The capacitive device according to claim 1 further comprising:

a weight, which includes a surface that function as an optical mirror, wherein the movable electrode extends out of the weight; and a pair of linking beams, which extend out of the weight in parallel to the surface of the substrate and are on the same axis, wherein the movable electrode is rotationally displaced around the axis, on which the linking beams are located, in response to an electrostatic force that is generated by applying a potential difference between the movable electrode and the fixed electrode in order to adjust an angle of the surface that function as the optical mirror.

4. The capacitive device according to claim 1 further comprising a vibration detecting means, wherein the movable electrode is vibrated along the directions substantially orthogonal to the surface of the substrate using an electrostatic force that is generated by applying a potential difference between the movable electrode and the fixed electrode, wherein when the capacitive device is rotated around an axis parallel to the surface of the substrate, another vibration along the directions that are substantially parallel to the surface of the substrate and orthogonal to the axis is generated due to Coriolis' force, and wherein an angular velocity of the rotation is measured by detecting the vibration generated due to Coriolis' force using the vibration detecting means.

5. The capacitive device according to claim 1, wherein one of the electrode-confronting surfaces is substantially planar, wherein the other of the electrode-confronting surfaces includes a first planar surface and a second planar surface, wherein the planar surfaces are substantially planar, wherein the first planar surface is located further away from the surface of the substrate than the second planar surface is, wherein the first planar surface is located further away from the one of the electrode-confronting surfaces than the second planar surface is.

6. The capacitive device according to claim 5, wherein the one of the electrode-confronting surfaces, the first planar surface, and the second planar surface are rectangular.

7. The capacitive device according to claim 5, wherein a length of the second planar surface along the directions substantially orthogonal to the surface of the substrate ranges from 20% to 80% of that of the one of the electrode-confronting surfaces.

8. The capacitive device according to claim 1, wherein the electrode-confronting surfaces are substantially planar and wherein one of the electrode-confronting surfaces is longer than the other of the electrode-confronting surfaces along the directions substantially orthogonal to the surface of the substrate.

9. The capacitive device according to claim 8, wherein the electrode-confronting surfaces are rectangular.

10. The capacitive device according to claim 8, wherein a length of the other of the electrode-confronting surfaces along the directions substantially orthogonal to the surface of the substrate ranges from 20% to 80% of that of the one of the electrode-confronting surfaces.

11. The capacitive device according to claim 1 further comprising another fixed electrode, which is stationary with respect to the substrate, wherein the another fixed electrode includes a substrate-confronting surface, at which the another fixed electrode confronts the surface of the substrate, and an electrode-confronting surface, wherein the movable electrode includes another electrode-confronting surface, wherein the substrate-confronting surface of the another fixed electrode is substantially parallel to the surface of the substrate, wherein the substrate-confronting surfaces of the movable electrode and the fixed electrodes are substantially planar and substantially at the same level along the directions that are substantially orthogonal to the surface of the substrate before the movable electrode is displaced, wherein the electrode-confronting surface of the another fixed electrode and the another electrode-confronting surface of the movable electrode confront each other and are substantially orthogonal to the surface of the substrate, wherein when the movable electrode is displaced in the first direction, the total sum of area-distance quotients in an overlap between the electrode-confronting surface of the another fixed electrode and the another electrode-confronting surface of the movable electrode remains substantially unchanged or decreases to provide a third reduction rate that is substantially zero or more, wherein when the movable electrode is displaced in the second direction, the total sum of area-distance quotients remains substantially unchanged or decreases to provide a fourth reduction rate that is substantially zero or more, wherein the first reduction rate is greater than the second reduction rate, wherein the third reduction rate is smaller than the fourth reduction rate, wherein the first reduction rate is greater than the third reduction rate, and wherein the second reduction rate is smaller than the fourth reduction rate.

12. The capacitive device according to claim 1 further comprising:

another movable electrode, which is located above the surface of the substrate and is movable with respect to the substrate along the directions that are substantially orthogonal to the surface of the substrate, wherein the another movable electrode includes a substrate-confronting surface, at which the another movable electrode confronts the surface of the substrate, and an electrode-confronting surface; and another fixed electrode, which is stationary with respect to the substrate, wherein the another fixed electrode includes a substrate-confronting surface, at which the another fixed electrode confronts the surface of the substrate, and an electrode-confronting surface, wherein the substrate-confronting surfaces of the another movable electrode and the another fixed electrode are substantially parallel to the surface of the substrate, wherein the substrate-confronting surfaces of the another movable electrode and the another fixed electrode are substantially planar and substantially at the same level along the directions that are substantially orthogonal to the surface of the substrate before the another movable electrode is displaced, wherein the electrode-confronting surfaces of the another movable electrode and the another fixed electrode confront each other and are substantially orthogonal to the surface of the substrate, wherein when the another movable electrode is displaced in the first direction, the total sum of area-distance quotients in an overlap between the electrode-confronting surfaces of the another electrodes remains substantially unchanged or decreases to provide a third reduction rate that is substantially zero or more, wherein when the another movable electrode is displaced in the second direction, the total sum of area-distance quotients remains substantially unchanged or decreases to provide a fourth reduction rate that is substantially zero or more, wherein the first reduction rate is greater than the second reduction rate, wherein the third reduction rate is smaller than the fourth reduction rate, wherein the first reduction rate is greater than the third reduction rate, and wherein the second reduction rate is smaller than the fourth reduction rate.

13. The capacitive device according to claim 1, wherein the capacitive device has a Silicon-On-Insulator structure, wherein the capacitive device further comprises an active layer, which includes the movable and fixed electrodes, and an insulating intermediate layer, wherein the active layer and the substrate are made of silicon, wherein the insulating intermediate layer is made of silicon oxide, wherein the movable electrode is supported by the substrate through the insulating intermediate layer, and wherein the fixed electrode is fixed onto the substrate through the insulating layer.

14. The capacitive device according to claim 1 further comprising four weights, three movable electrodes, and three fixed electrodes, wherein the four weights are arranged in the shape of a cross, wherein each of the movable electrodes extends from each of the weights in a direction orthogonal to the longitudinal directions of each of the weights such that the weights and the movable electrodes are substantially point symmetrical, and wherein each of the movable electrodes confronts each of the fixed electrodes.

* * * * *

UNITED STATES PATENT AND TRADEMARK OFFICE
CERTIFICATE OF CORRECTION

PATENT NO. : 6,785,117 B2  
APPLICATION NO. : 10/386100  
DATED : August 31, 2004  
INVENTOR(S) : Sakai et al.

Page 1 of 1

It is certified that error appears in the above-identified patent and that said Letters Patent is hereby corrected as shown below:

On The Title Page, Item (73)  
Please correct Assignees information from:    Denso Corporation, Kaiya (JP)

to:    Denso Corporation, Kariya (JP)

Signed and Sealed this

Eighteenth Day of March, 2008

JON W. DUDAS  
*Director of the United States Patent and Trademark Office*